US011112838B2

(12) United States Patent
Sung et al.

(10) Patent No.: US 11,112,838 B2
(45) Date of Patent: Sep. 7, 2021

(54) ELECTRONIC DEVICE AND METHOD FOR CHANGING LOCATION OF PREVIEW IMAGE ACCORDING TO DIRECTION OF CAMERA

(71) Applicant: Samsung Electronics Co., Ltd., Suwon-si (KR)

(72) Inventors: Wonkyu Sung, Suwon-si (KR); Kangmoon Kim, Suwon-si (KR); Sojung Kim, Suwon-si (KR); Dahyun Lee, Suwon-si (KR); Jungwon Lee, Suwon-si (KR); Junho Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/503,954

(22) Filed: Jul. 5, 2019

(65) Prior Publication Data

US 2020/0012324 A1    Jan. 9, 2020

(30) Foreign Application Priority Data

Jul. 6, 2018   (KR) ..................... 10-2018-0078649

(51) Int. Cl.

| G06F 3/033 | (2013.01) |
| G06F 1/16 | (2006.01) |
| G06T 7/70 | (2017.01) |
| G06F 3/0346 | (2013.01) |
| G09F 9/30 | (2006.01) |

(Continued)

(52) U.S. Cl.
CPC .......... *G06F 1/1694* (2013.01); *G06F 1/1652* (2013.01); *G06F 3/0346* (2013.01);
(Continued)

(58) Field of Classification Search
CPC .... G06F 1/1694; G06F 1/1652; G06F 1/1677; G06F 1/1643; G06F 1/1615;
(Continued)

(56) References Cited

U.S. PATENT DOCUMENTS

| 2013/0002595 A1 | 1/2013 | Asagi | |
| 2013/0076681 A1* | 3/2013 | Sirpal | ................. G06F 1/1643 345/173 |

(Continued)

FOREIGN PATENT DOCUMENTS

| EP | 2 981 050 A1 | 2/2016 |
| EP | 3 279 763 A1 | 2/2018 |

(Continued)

OTHER PUBLICATIONS

Extended European Search Report dated Nov. 11, 2019, issued in European Application No. 19184780.5.

(Continued)

*Primary Examiner* — Adam J Snyder
(74) *Attorney, Agent, or Firm* — Jefferson IP Law, LLP

(57) ABSTRACT

An electronic device is provided. The electronic device includes a first housing including a first face and a second face, a second housing including a third face and a fourth face, a folding part rotatably connecting the first housing and the second housing, a flexible display disposed on the first face and the third face, a camera exposed through at least a portion of the fourth face, a memory configured to store instructions, and a processor configured to determine an orientation of the electronic device and a direction in which the camera is pointed while a camera application is executed, identify the first area or the second area as an area in which a preview image acquired through the camera is displayed based at least on the determined direction and the determined orientation, and display the preview image, acquired through the camera, in the identified area using the flexible display.

20 Claims, 18 Drawing Sheets

(51) Int. Cl.
*H04M 1/02* (2006.01)
*H04M 1/72403* (2021.01)
*H04N 5/225* (2006.01)
*H04N 5/232* (2006.01)

(52) U.S. Cl.
CPC .............. *G06T 7/70* (2017.01); *G09F 9/301* (2013.01); *G06F 1/1615* (2013.01); *G06F 1/1643* (2013.01); *G06F 1/1677* (2013.01); *G06F 2200/1614* (2013.01); *G06F 2200/1637* (2013.01); *G06F 2203/04803* (2013.01); *H04M 1/0243* (2013.01); *H04M 1/0264* (2013.01); *H04M 1/0268* (2013.01); *H04M 1/72403* (2021.01); *H04M 2201/34* (2013.01); *H04M 2201/36* (2013.01); *H04N 5/2257* (2013.01); *H04N 5/23293* (2013.01)

(58) Field of Classification Search
CPC ......... G06F 3/0346; G09F 9/301; G06T 7/70; H04M 1/0243; H04M 1/0264; H04M 1/0268; H04M 1/72403; H04N 5/23293; H04N 5/2257
See application file for complete search history.

(56) References Cited

U.S. PATENT DOCUMENTS

| | | | | |
|---|---|---|---|---|
| 2014/0285476 | A1* | 9/2014 | Cho | G06F 1/1601 345/204 |
| 2016/0026381 | A1* | 1/2016 | Kim | G06F 3/04817 715/761 |
| 2016/0050408 | A1* | 2/2016 | Lee | H04N 5/247 348/47 |
| 2016/0085319 | A1* | 3/2016 | Kim | G06F 3/0346 345/156 |
| 2016/0179236 | A1* | 6/2016 | Shin | G06F 1/1616 |
| 2016/0198100 | A1* | 7/2016 | Cho | H04N 5/23293 348/222.1 |
| 2017/0052566 | A1* | 2/2017 | Ka | G06F 1/1694 |
| 2017/0075640 | A1* | 3/2017 | Chun | G06F 3/1446 |
| 2017/0094168 | A1* | 3/2017 | Kang | H04M 1/0268 |
| 2017/0289444 | A1 | 10/2017 | Han et al. | |
| 2017/0293383 | A1* | 10/2017 | Lee | G06F 3/048 |

FOREIGN PATENT DOCUMENTS

| | | |
|---|---|---|
| KR | 10-2016-0021497 A | 2/2016 |
| KR | 10-2017-0079545 A | 7/2017 |

OTHER PUBLICATIONS

International Search Report dated Oct. 11, 2019, issued in International Application No. PCT/KR2019/008223.

European Office Action dated Sep. 25, 2020, issued in European Patent Application No. 19184780.5.

* cited by examiner

ELECTRONIC DEVICE AND METHOD FOR CHANGING LOCATION OF PREVIEW IMAGE ACCORDING TO DIRECTION OF CAMERA

CROSS-REFERENCE TO RELATED APPLICATION(S)

This application is based on and claims priority under 35 U.S.C. § 119 of a Korean patent application number 10-2018-0078649, filed on Jul. 6, 2018, in the Korean Intellectual Property Office, the disclosure of which is incorporated by reference herein in its entirety.

BACKGROUND

1. Field

The disclosure relates to an electronic device for adaptively changing the location of a preview image according to the direction of a camera and an operation method thereof.

2. Description of Related Art

Electronic devices having a camera function, such as a smartphone, a tablet personal computer (PC), and a smart watch, are being developed. Meanwhile, a foldable-type electronic device is being developed in order to provide improved portability and to provide a wider-sized screen.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for adaptively changing the location of a preview image according to the direction of a camera and an operation method thereof.

A user of a portable electronic device is able to perform photographing in an uncomfortable posture in order to obtain images having various views. Therefore, a solution may be required in order to acquire images having various views in a comfortable posture using a portable electronic device.

Additional aspects will be set forth in part in the description which follows and, in part, will be apparent from the description, or may be learned by practice of the presented embodiments.

The technical subjects pursued in the disclosure may not be limited to the above mentioned technical subjects, and other technical subjects which are not mentioned may be clearly understood, through the following descriptions, by those skilled in the art of the disclosure.

In accordance with an aspect of the disclosure, an electronic device is provided. The electronic device includes a first housing including a first face and a second face, the second face being a rear side of the first face, a second housing including a third face and a fourth face, the fourth face being a rear side of the third face, a folding part rotatably connecting the first housing and the second housing to each other, a flexible display disposed on the first face and the third face across the folding part and including a first area corresponding to the first face and a second area corresponding to the third face, at least one camera exposed through at least a portion of the fourth face, at least one memory configured to store instructions, and at least one processor, wherein the at least one processor may be configured, when the instructions are executed, to determine an orientation of the electronic device and a direction in which the at least one camera is pointed while a camera application is executed, identify at least one of the first area or the second area as an area in which a preview image acquired through the at least one camera is displayed based at least on the determined direction and the determined orientation, and display the preview image, acquired through the at least one camera, in the identified area using the flexible display.

In accordance with another aspect of the disclosure, an electronic device is provided. The electronic device includes a first housing including a first face and a second face, the second face facing away from the first face, a second housing including a third face and a fourth face, the fourth face facing away from the third face, a folding part rotatably connecting a side face of the first housing and a side face of the second housing, which faces the side face of the first housing, a flexible display disposed on the first face and the third face across the folding part and including a first area corresponding to the first face and a second area corresponding to the third face, at least one camera exposed through at least a portion of the fourth face, at least one memory configured to store instructions, and at least one processor, wherein the at least one processor may be configured, when the instructions are executed, to determine a direction in which the at least one camera is pointed while a camera application is executed, and display a preview image, acquired through the at least one camera, in the first area using the flexible display based on identification that the determined direction correspond to one of the multiple reference directions.

In accordance with another aspect of the disclosure, an electronic device is provided. The electronic device includes a first housing including a first face and a second face, the second face facing away from the first face, a second housing including a third face and a fourth face, the fourth face facing away from the third face, a folding part rotatably connecting a side face of the first housing and a side face of the second housing, which faces the side face of the first housing, a flexible display disposed on the first face and the third face across the folding part and including a first area corresponding to the first face and a second area corresponding to the third face, at least one camera exposed through at least a portion of the fourth face, at least one memory configured to store instructions, and at least one processor, wherein the at least one processor may be configured, when the instructions are executed, to identify whether a direction in which the at least one camera is pointed is changed while a preview image acquired through the at least one camera is displayed in the second area using the flexible display, and move the preview image from the second area to the first area using the flexible display in response to an identification result.

In accordance with another aspect of the disclosure, a method of operating an electronic device including a flexible display extending across a first housing and a second housing is provided. The method includes determining an orientation of the electronic device and a direction in which at least one camera, which is exposed through at least a portion of the first housing of the electronic device, is pointed during execution of a camera application, identifying at least one of the first area corresponding to the first housing or the second area corresponding to the second housing as an area in which a preview image acquired through the at least one camera is displayed based at least on the determined direction and the determined orientation, and displaying the preview image, acquired through the at least one camera, in the identified area.

In accordance with another aspect of the disclosure, a method of operating an electronic device is provided. The method includes determining a direction in which at least one camera exposed through at least a portion of the first housing of the electronic device is pointed during execution of a camera application, and displaying a preview image, acquired through the at least one camera, in a display area corresponding to the second housing of the electronic device, which is distinct from the first housing, among the entire display area of the flexible display of the electronic device on the basis of identifying that the determined direction corresponds to one of the multiple reference directions.

In accordance with another aspect of the disclosure, a method of operating an electronic device is provided. The method includes identifying whether a direction in which at least one camera exposed through at least a portion of the first housing of the electronic device is pointed is changed while a preview image acquired through the at least one camera is displayed in an area corresponding to the first housing among the total area of a flexible display of the electronic device, and moving the preview image from the area corresponding to the first housing to an area corresponding to the second housing of the electronic device, which is distinct from the first housing, among the entire display area of the flexible display in response to an identification result.

With an electronic device according to various embodiments and a method of operating the same, it is possible to provide an improved user experience by adaptively changing the location at which a preview image is displayed depending on the direction in which a camera is pointed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
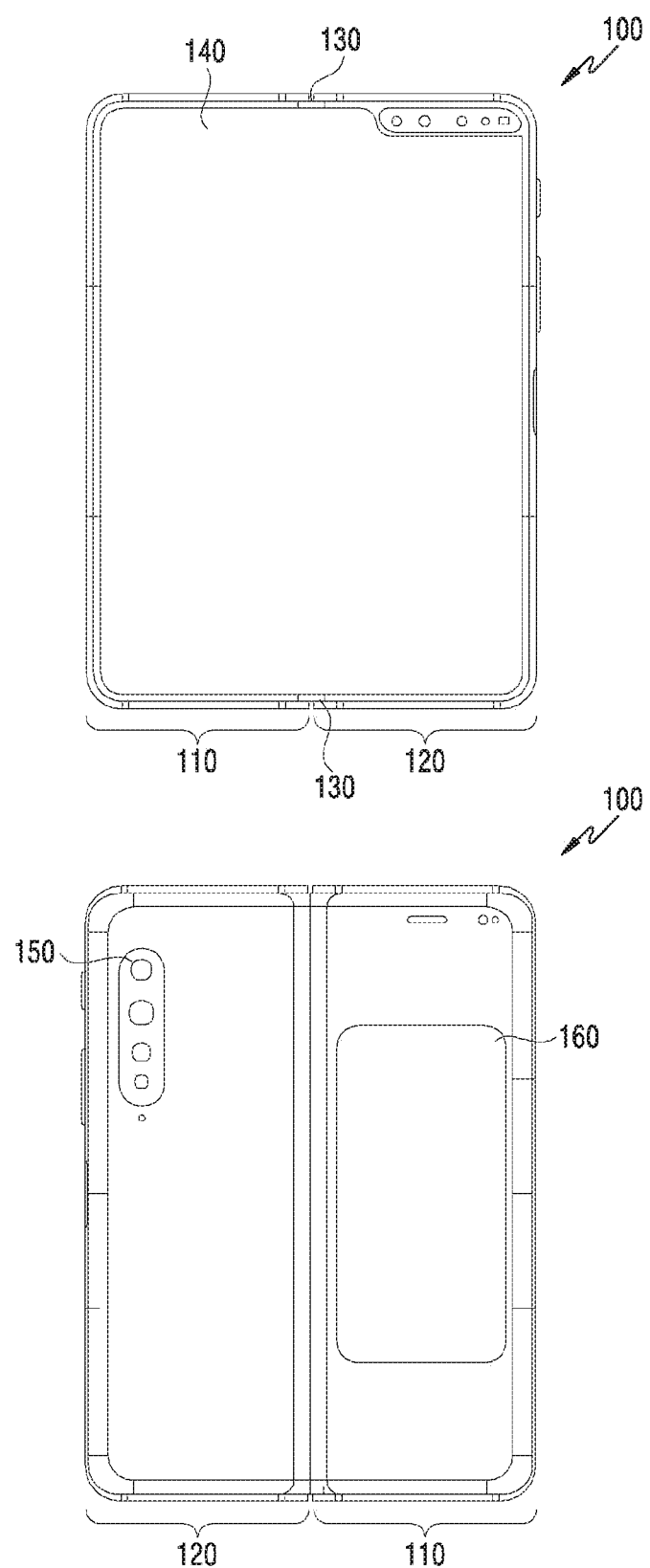
FIG. 1 illustrates an example of front and rear views of a foldable electronic device in an outspread state according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the expression "have", "may have", "include" or "may include" refers to existence of a corresponding feature (e.g., numerical value, function, operation, or components such as elements), and does not exclude existence of additional features.

In the disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a Motion Pictures Experts Group (MPEG)-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television (TV), a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and Play Station™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the disclosure may be a combination of one or more of the aforementioned various devices. The electronic device according to some embodiments may be a flexible electronic device or a foldable electronic device. Further, the electronic device according to an embodiment of the disclosure is not limited to the aforementioned devices, and may include a new electronic device according to the development of technology.

In the disclosure, the term "user" may indicate a person using an electronic device or a device (e.g., an artificial intelligence electronic device) using an electronic device.

Hereinafter, various embodiments will be described in detail with reference to the accompanying drawings. For convenience of explanation, components may be exaggerated or reduced in size in the drawings. For example, the size and thickness of each component shown in the drawings are arbitrarily shown for convenience of explanation, and thus the disclosure is not necessarily limited to those illustrated in the drawings.

FIG. 1 illustrates an example of front and rear views of a foldable electronic device in an outspread state according to an embodiment of the disclosure.

Referring to FIG. 1, a foldable electronic device 100 according to various embodiments includes a first housing 110, a second housing 120, a folding part 130, a flexible display 140, at least one camera 150, and/or a display 160.

In various embodiments, the first housing 110 may include a first face and a second face that faces away from the first face. In various embodiments, the second housing 120 may include a third face and a fourth face that faces away from the third face.

In various embodiments, the first housing 110 and the second housing 120 may be connected by the folding part 130. For example, the folding part 130 may be configured to be coupled to each of a side face of the first housing 110 and a side face of the second housing 120 that faces the side face of the first housing 110 so as to pivotally or rotatably connect the first housing 110 and the second housing 120 to each other.

The flexible display 140 may be disposed on the first housing 110 and the second housing 120 across the folding part 130. In various embodiments, the flexible display 140 may be configured to be supported by the first housing 110 and the second housing 120. In various embodiments, the flexible display 140 may be disposed on the first face and the third face across the folding part 130. In various embodiments, the flexible display 140 may include a first area corresponding to the first face and a second area corresponding to the third face.

The foldable electronic device 100 according to various embodiments may be folded on the basis of the folding part 130. For example, the folding part 130 may be disposed between the first housing 110 and the second housing 120 of the foldable electronic device 100 so as to allow the foldable electronic device 100 to be bent, flexed, or folded. In various embodiments, the first housing 110 may be connected to the second housing 120 through the folding part 130 so as to rotate about the folding part 130. In various embodiments, the second housing 120 may be connected to the first housing 110 through the folding part 130 so as to rotate about the folding part 130. In various embodiments, the first housing 110 and the second housing 120 may be folded to face each other by rotating about the folding part 130. In various embodiments, the first housing 110 and the second housing 120 may be substantially superimposed or may overlap each other.

In various embodiments, the foldable electronic device 100 may provide a first state in which the first housing 110 and the second housing 120 are folded out by the folding part 130. In various embodiments, in the first state, the first face may be substantially flush with the third face. In various embodiments, the foldable electronic device 100 may provide the first state in which the first housing 110 and the second housing 120 are substantially flush with each other by being folded out about the folding part 130. In various embodiments, the first state may be the state in which, among the total area of the flexible display 140, all of a first area corresponding to the first face, a second area corresponding to a third face, and a third area enclosing the folding part 130 are capable of being provided within the a field of view or angle of view of a user facing the front face of the foldable electronic device 100. In various embodiments, the first state may be referred to as an outspread state, or may be referred to as an unfolded state.

In various embodiments, the foldable electronic device 100 may provide a second state in which the first housing 110 and the second housing 120 are folded in by the folding part 130. In various embodiments, in the second state, the first face may be superimposed on the third face. In various embodiments, the foldable electronic device 100 may provide the second state in which the folding part 130 is folded such that the front face (e.g., the first face) of the first housing 110 and the front face (e.g., the third face) of the second housing 120 face each other and thus the first housing 110 and the second housing 120 are disposed to be parallel to each other. In various embodiments, the second state may be the state in which the flexible display 140 is hidden within a field of view of the user facing the front face of the foldable electronic device 100. In various embodiments, the second state may be referred to as a folded state.

In various embodiments, the flexible display 140 may be disposed on the front face (e.g., the third face) of the second housing 120 across the first housing 110 and the folding part 130. According to some embodiments, the flexible display 140 may include a flexible touch screen device that includes a touch sensor. According to various embodiments, the flexible display 140 may include a touch sensor and a force sensor. The foldable electronic device 100 according to various embodiments may be folded on the basis of the folding part 130. The flexible display 140 is bendable by the operation folding of the electronic device 100 because the flexible display 140 is disposed from the first housing 110 to the second housing 120 across the folding part 130. For example, in the flexible display 140, unlike the first area disposed on the first face of the first housing 110 and the second area disposed on the third face of the second housing 120, the third area disposed above the folding part 130 is bendable according to the operation of folding the electronic device 100. In various embodiments, the third area may be curved and bent in order to prevent breakage of the flexible display 140.

In various embodiments, at least one of the first area and the second area may further include a curved area, such as the third area. For example, an end, which is located away from the center of the first housing 110, may include a round area. As another example, an end, which is located away from the center of the second housing 120, may include a round area. In various embodiments, the curved display area included in the first area and the curved display area included in the second area are disposed at the ends of the first housing 110 and the second housing 120, respectively, and thus each of the curved display area may be referred to as an edge display.

In various embodiments, at least one camera 150 may be exposed through at least a portion of the rear face (e.g., the fourth face) of the second housing 120. In various embodiments, at least one camera 150 may include multiple cameras having different characteristics. For example, the at least one camera 150 may include at least one telephoto camera and at least one wide-angle camera. As another example, the at least one camera 150 may include at least one monochrome camera for acquiring a monochrome image and at least one RGB camera for acquiring a color image. However, the disclosure is not limited thereto.

In various embodiments, the display 160 may be exposed through at least a portion of the rear face (e.g., the second face) of the first housing 110.

Figure 2:
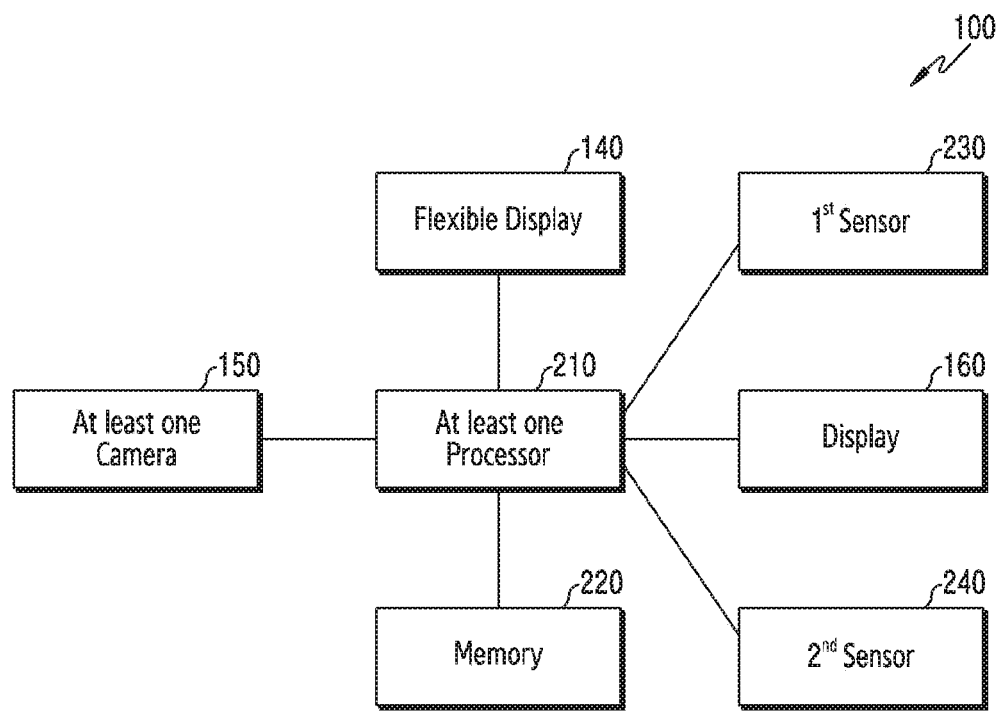
FIG. 2 illustrates an example of a functional configuration of an electronic device according to an embodiment of the disclosure.

FIG. 2 illustrates an example of a functional configuration of an electronic device according to an embodiment of the disclosure. This functional configuration may be included in the electronic device 100 illustrated in FIG. 1.

Referring to FIG. 2, the electronic device 100 may include a flexible display 140, at least one camera 150, a display 160, at least one processor 210, a memory 220, a first sensor 230, and/or a second sensor 240.

The at least one processor 210 may control the overall operation of the electronic device 100. The at least one processor 210 may execute applications that provide advertisements, the Internet, games, video images, and the like. In various embodiments, the at least one processor 210 may include a single processor core, or may include multiple processor cores. For example, the at least one processor 210 may include a multi-core processor such as a dual-core, quad-core, or hexa-core processor. According to embodiments, the at least one processor 210 may further include a cache memory located internally or externally.

The at least one processor 210 may receive instructions from other components of the electronic device 100, may interpret the received instructions, may perform calculations, or may process data according to the interpreted instructions.

The at least one processor 210 may process data or signals produced or generated in an application. For example, the at least one processor 210 may request instructions, data, or signals from memory 220 in order to execute or control an application. The at least one processor 210 may record (or store) or update instructions, data, or signals in the memory 220 in order to execute or control an application.

The at least one processor 210 may be configured to interpret and process messages, data, instructions, or signals received from the memory 220, the flexible display 140, the at least one camera 150, the display 160, the first sensor 230, or the second sensor 240. The at least one processor 210 may produce new messages, data, instructions, or signals on the basis of received messages, data, instructions, or signals. The at least one processor 210 may provide processed or produced message, data, instructions, or signals to the memory 220, the flexible display 140, the at least one camera 150, the display 160, the first sensor 230, or the second sensor 240.

All or a part of at least one processor 210 may be electrically or functionally coupled with or connected to other components within the electronic device 300 (e.g., the memory 220, the flexible display 140, the at least one camera 150, the display 160, the first sensor 230, or the second sensor 240).

According to embodiments, the at least one processor 210 may be configured with one or more processors. For example, the at least one processor 210 may include at least one of an application processor (AP) that controls a higher-layer program such as an application, a graphic processing unit (GPU) that controls the display of at least one of the flexible display 140 and the display 160, or a communication processor (CP) that performs control for communication.

The memory 220 may store instructions, control instruction codes, control data, or user data for controlling the electronic device 100. For example, the memory 220 may include an application, an operating system (OS), a middleware, and a device driver.

The memory 220 may include at least one of volatile memory and nonvolatile memory. The volatile memory may include dynamic random-access memory (DRAM), static RAM (SRAM), synchronous DRAM (SDRAM), phase-change RAM (PRAM), magnetic RAM (MRAM), resistive RAM (RRAM), ferroelectric RANI (FeRAM), and the like. The nonvolatile memory may include read only memory (ROM), programmable ROM (PROM), electrically programmable ROM (EPROM), electrically erasable ROM (EEPROM), flash memory, and the like.

The memory 220 may be a nonvolatile medium such as a hard disk drive (HDD), a solid-state disk (SSD), an embedded multimedia card (eMMC), or a universal flash storage (UFS).

The flexible display 140 may output contents, data, or signals. In various embodiments, the flexible display 140 may display image data processed by the at least one processor 210. For example, the flexible display 140 may display a captured or still image. As another example, the flexible display 140 may display a video image or a camera preview image. As another example, the flexible display 140 may display a graphical user interface (GUI) such that a user is able to interact with the electronic device 100.

According to embodiments, the flexible display 140 may be configured with an integrated touch screen by being coupled with a touch sensor capable of receiving a touch input and the like.

At least one camera 150 may capture a still image or a video image. In various embodiments, the at least one camera 150 may include one or more lenses, an image sensor, an image signal processor (ISP), or a flash. In various embodiments, the at least one camera 150 may be configured with multiple cameras. When the at least one camera 150 is configured with multiple cameras, the at least one camera 150 may include multiple cameras having different characteristics. For example, the at least one camera 150 may include at least one telephoto camera and at least one wide-angle camera. As another example, the at least one camera 150 may include at least one monochrome camera for acquiring a monochrome image and at least one red, green, blue (RGB) camera for acquiring a color image. As another example, the at least one camera 150 may include multiple cameras having different pixel numbers. However, the disclosure is not limited thereto.

The display 160 may output contents, data, or signals. In various embodiments, the display 160 may display image data processed by the at least one processor 210. For example, the display 160 may display a captured or still image. As another example, the display 160 may display a video image or a camera preview image. As another example, the display 160 may display a graphical user interface (GUI) such that a user is able to interact with the electronic device 100.

According to embodiments, the display 160 may be configured with an integrated touch screen by being coupled with a touch sensor capable of receiving a touch input or the like.

The first sensor 230 may acquire information on the orientation of the electronic device 100. In various embodiments, the first sensor 230 may include at least one of a sensor for acquiring data on a change in the linear motion of the electronic device 100, a sensor for acquiring data on a change in the rotational motion of the electronic device 100, and a sensor for acquiring data about the geographical location of the electronic device 100. For example, the first sensor 230 may include at least one of a geomagnetic sensor, a gyro sensor, or an infrared sensor.

The second sensor 240 may obtain information about the angle between the first housing 110 and the second housing 120 of the electronic device 100. In various embodiments, the second sensor 240 may acquire information on the angle between the first housing 110 and the second housing 120 of the electronic device 100 in order to provide information on the states of the electronic device 100 (e.g., the first state and second state defined in FIG. 1). In various embodiments, the second sensor 240 may be included within the folding part 130.

In various embodiments, the at least one processor 210 may determine a direction in which the at least one camera 150 is pointed while executing a camera application stored or installed in the electronic device 100. In various embodiments, the at least one processor 210 may determine the direction in which the at least one camera 150 is pointed during the execution of the camera application using the first sensor 230. For example, the at least one processor 210 may determine the direction in which the at least one camera 150 is pointed in order to identify whether or not the at least one camera 150 is facing downward or forward.

Figure 3:
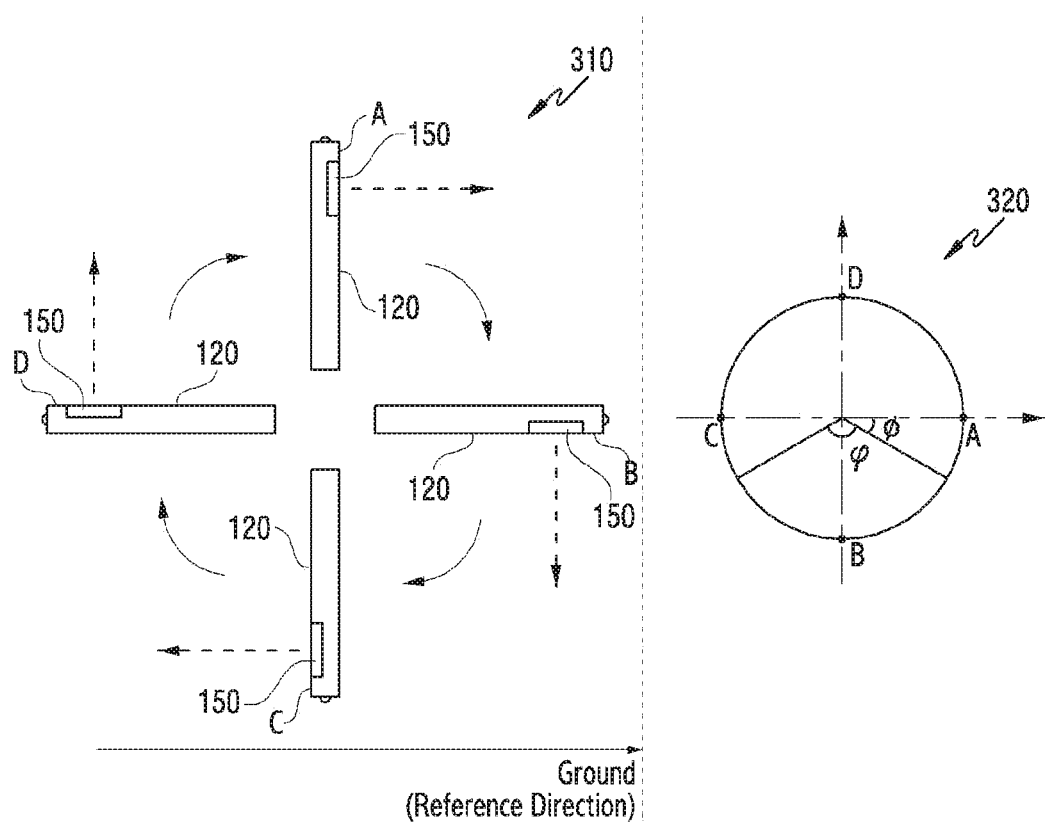
FIG. 3 illustrates an example of orientations of an electronic device related to a direction of at least one camera thereof according to an embodiment of the disclosure.

FIG. 3 illustrates an example of orientations of an electronic device related to the direction of at least one camera thereof according to an embodiment of the disclosure.

Referring to FIG. 3, in a state 310, the direction in which the at least one camera 150 is pointed may be changed with reference to the ground (or a reference direction) according to the motion state (or the user's manipulation) of the electronic device 100. For example, when the orientation of the electronic device 100 is formed as an attitude A of the state 310, the angle between the direction of the at least one camera 150 and the ground (or the reference direction) may be 0 degrees as shown in a graph 320. As another example, when the orientation of the electronic device 100 is formed as an attitude B of the state 310, the angle between the direction of the at least one camera 150 and the ground (or the reference direction) may be −90 degrees as shown in the graph 320. As another example, when the orientation of the electronic device 100 is formed as an attitude C of the state 310, the angle between the direction of the at least one camera 150 and the ground (or the reference direction) may be 180 degrees. As another example, when the orientation of the electronic device 100 is formed as an attitude D of the state 310, the angle between the direction of the at least one camera 150 and the ground (or the reference direction) may be 90 degrees.

In various embodiments, the at least one processor 210 may display a preview image, acquired through the at least one camera 150, in the first area corresponding to the first face of the first housing using the flexible display 140 on the basis of identifying that the determined direction corresponds to one of multiple reference directions. In various embodiments, the multiple reference directions may be defined or configured in the electronic device 100 in order to identify whether the at least one camera 150 faces downward.

For example, referring to FIG. 3, as shown in the graph 320, the multiple reference directions may be configured with directions corresponding to angles from −Φ from to −Φ-ψ. For example, when the angle between the direction in which the at least one camera 150 is pointed and the ground is within a range between −Φ-ψ and −Φ, the at least one processor 210 may determine that the determined direction corresponds to one of the multiple reference directions. As another example, when the angle between the direction in which the at least one camera 150 is pointed and the ground is out of the above-mentioned range, the at least one processor 210 may determine that the determined direction is different from all of the multiple reference directions.

In various embodiments, when an image is acquired in the state in which the direction in which the at least one camera 150 is pointed corresponds to one of the multiple reference directions, the acquired image may be an aerial view or a bird's eye view. When the at least one camera 150 is pointed in a direction corresponding to one of the multiple reference directions, the at least one processor 210 according to various embodiments is capable of displaying a preview image in the first area corresponding to the first housing 110 distinguished from the second housing 120 in which the at least one camera 150 is disposed, so that the user is capable of performing photography in a more comfortable posture. In other words, the electronic device 100 according to various embodiments is capable of providing an enhanced user experience by adaptively changing the display location of the preview image according to the direction in which the at least one camera 150 is pointed.

In various embodiments, when the angle between the first housing 110 and the second housing 120 is within a specified range and the direction of the at least one camera 150 corresponds to one of the reference directions, the at least one processor 210 may display a preview image obtained through the at least one camera 150 in the first area using the flexible display 140. In various embodiments, the at least one processor 210 may acquire or determine information about the angle between the first housing 110 and the second housing 120 using the second sensor 240. In various embodiments, the specified range may be defined or configured in the electronic device 100 in order to identify whether the state of the electronic device 100 is the first state or the second state defined in the description made with reference to FIG. 1.

Figure 4:
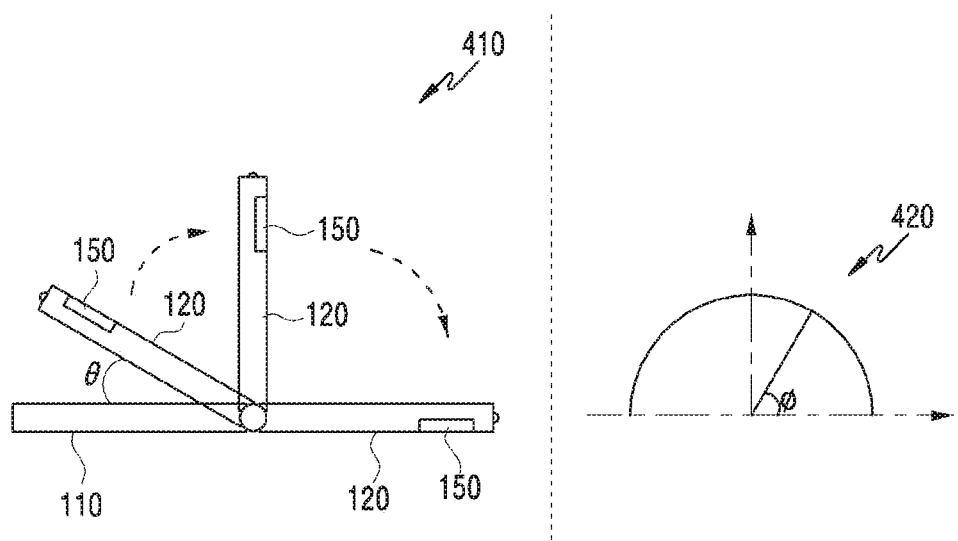
FIG. 4 illustrates an example of orientations of an electronic device related to a positional relationship between a first housing and a second housing thereof according to an embodiment of the disclosure.

FIG. 4 illustrates an example of orientations of an electronic device related to a positional relationship between a first housing and a second housing thereof according to an embodiment of the disclosure.

Referring to FIG. 4, since the first housing 110 and the second housing 120 are rotatably connected to each other via the folding part 130 as in a state 410, the electronic device 100 may have various orientations depending on the angle between the first housing 110 and the second housing 120. The angle between the first housing 110 and the second housing 120 may be defined as shown in a graph 420. In various embodiments, the first state may be the state in which the angle between the first housing 110 and the second housing 120 is out of the specified range (e.g., ranging from Φ to 180 (degrees) in the graph 420). In various embodiments, the second state may be the state in which the angle between the first housing 110 and the second housing 120 is in the specified range (e.g., ranging from 0 to Φ (degrees) in the graph 420). In various embodiments, when the at least one camera 150 of the electronic device 100 in the second state is oriented in a direction corresponding to one of the multiple reference directions, the at least one processor 210 may display the preview image in the first area. When the at least one camera 150 in the second state is oriented in a direction corresponding to one of the multiple reference directions, the electronic device 100 may display the preview image in the first area, so that the user is capable of performing photography in a more comfortable posture. In other words, while in a specified state (e.g., the second state), the electronic device 100 according to various embodiments is capable of providing an enhanced user experience by adaptively changing the display location of the preview image depending on the direction in which the at least one camera 150 is pointed.

In various embodiments, when the electronic device 100 is in an orientation for photographing a landscape and the at least one camera 150 is oriented in a direction corresponding to one of the multiple reference directions, the at least one processor 210 may display a preview image, acquired through the at least one camera 150, in the first area using the flexible display 140. In various embodiments, the at least one processor 210 may determine whether the electronic device 100 has an orientation for photographing a landscape or an orientation for photographing a portrait using the first sensor 230. In various embodiments, the orientation for photographing a landscape and the orientation for photographing a portrait may be defined or configured in the electronic device 100 on the basis of the angle between the second housing 120 (or the first housing 110) and the ground.

Figure 5:
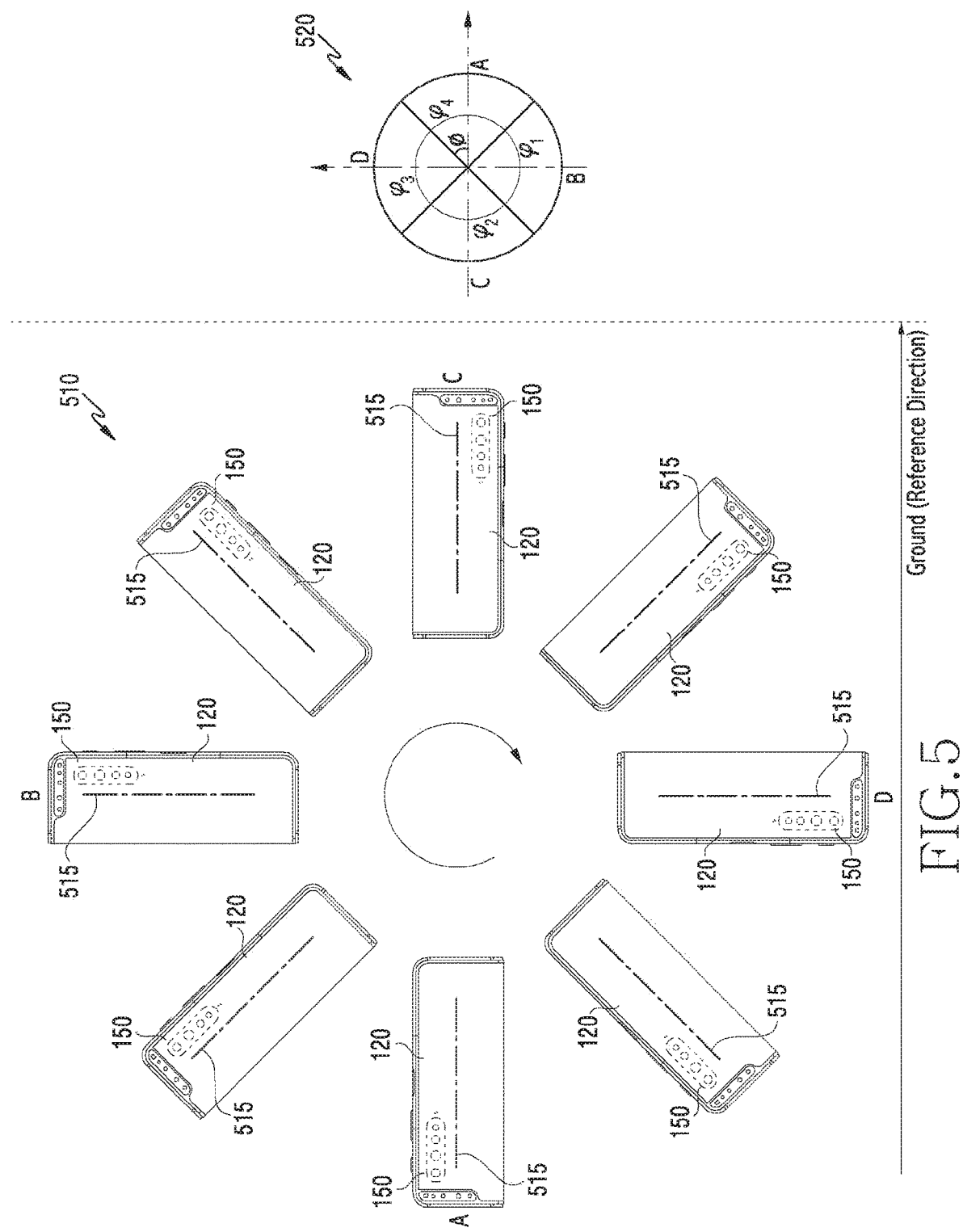
FIG. 5 illustrates an example of orientations of an electronic device related to a positional relationship between the ground and the electronic device according to an embodiment of the disclosure.

FIG. 5 illustrates an example of orientations of an electronic device related to a positional relationship between the ground and the electronic device according to an embodiment of the disclosure.

Referring to FIG. 5, in a state 510, the electronic device 100 may have various orientations depending on the angle between a line 515 extending along the second housing 120 and the ground. For example, when the electronic device 100 has an orientation A, the angle between the line 515 and the ground may be configured to be zero, as shown in a graph 520. For example, when the electronic device 100 has an orientation B, the angle between the line 515 and the ground may be configured to be −90 degrees, as shown in the graph 520. In another example, when the electronic device 100 has an orientation C, the angle between the line 515 and the ground may be configured to be 180 degrees, as shown in the graph 520. In another example, when the electronic device 100 has an orientation D, the angle between the line 515 and the ground may be configured to be 90 degrees, as shown in the graph 520.

In various embodiments, the orientation for photographing a landscape may be defined as the state in which the angle between the line 515 and the face of the earth is in a first specified range (e.g., ranging from $\Phi-\psi_1$ to $\Phi$ (degrees) in the graph 520) and/or in a second specified range (e.g., ranging from $\Phi+\psi_3$ to $\Phi+\psi_3+\psi_2$ (degrees)). In various embodiments, the orientation for photographing a portrait may be defined as the state in which the angle between the line 515 and the ground is in a third specified range (e.g., ranging from $\Phi$ to $\Phi+\psi_3$ (degrees) in the graph 520) and/or a fourth specified range (e.g., ranging from $\Phi+\psi_3+\psi_2$ to $\Phi+\psi_3+\psi_2+\psi_1$ (degrees) in the graph 520). In various embodiments, when the at least one camera 150 of the electronic device 100 is oriented to photograph a landscape is pointed in a direction corresponding to one of the multiple reference directions, the at least one processor 210 may display the preview image in the first area. When the at least one camera 150 is pointed in a direction corresponding to one of the multiple reference directions in the state in which the electronic device 100 is oriented to photograph a landscape, the electronic device 100 may display the preview image in the first area, so that the user is capable of performing photography in a more comfortable posture. In other words, while in a specified orientation (e.g., the orientation for photographing a landscape), the electronic device 100 according to various embodiments is capable of providing an enhanced user experience by adaptively changing the display location of the preview image depending on the direction in which the at least one camera 150 is pointed.

In various embodiments, when the at least one camera 150 is oriented in a direction corresponding to one of the multiple reference directions while the electronic device 100 in the second state is oriented to photograph a landscape, the at least one processor 210 may display a preview image in the first area corresponding to the first housing 110, which is distinct from the second housing 120 in which the at least one camera 150 is disposed.

In various embodiments, on the basis of identifying that the determined direction of the at least one camera 150 is different from the multiple reference directions, the at least one processor 210 may display a preview image, acquired through the at least one camera 150, in the second area different from the first area using the flexible display 140. For example, on the basis of identifying that the direction of the at least one camera 150 of the electronic device 100 in the second state is different from the multiple reference directions, the at least one processor 210 may display the preview image in the second area. As another example, on the basis of identifying that the direction of the at least one camera 150 of the electronic device 100 is oriented to photograph a landscape is different from the multiple reference directions, the at least one processor 210 may display the preview image in the second area. As another example, on the basis of identifying that the at least one camera 150 is oriented in a direction different from all of the multiple reference directions while the electronic device 100 in the second state is oriented to photograph the landscape, the at least one processor 210 may display the preview image in the second area.

In various embodiments, while the preview image is being displayed in the first area, the at least one processor 210 may display a capture icon for acquiring an image for the preview image in the second area using the flexible display 140. When the at least one camera 150 of the electronic device 100 in the second state is oriented in a direction corresponding to one of the multiple reference directions, the user may feel more comfortable when gripping a portion of the first housing 110 rather than gripping a portion of the second housing 120. In order to allow the user to perform photographing in the convenient state, the at least one processor 210 may display a capture icon for acquiring an image for the preview image in the second area corresponding to the second housing 120 while the preview image is being displayed in the first area corresponding to the first housing 110.

In various embodiments, in response to reception of input for the capture icon, the at least one processor 210 may acquire the image for the preview image and may store the acquired image. In various embodiments, in response to acquisition of the image, the at least one processor 210 may display a thumbnail image for representing the acquired image in the second image using the flexible display 140. In various embodiments, the thumbnail image may be displayed together with the capture icon.

In various embodiments, while the preview image is being displayed in the first area, the second area may further include other icons, which are distinct from the capture. For example, the second area may include at least one of: at least one first icon for selecting a type of the image to be acquired (e.g., a video image or a still image); at least one second icon for selecting an effect to be applied to the image to be acquired (e.g., a filter option icon), at least one third icon for adjusting the magnification of the image to be acquired; at least one fourth icon for selecting the direction of a camera to be used for acquiring an image; at least one fifth icon for determining whether or not to output flash when acquiring an image; or at least one thumbnail image for representing each of one or more most recently acquired images.

In various embodiments, on the basis of receiving an input for an icon included in the second area, the at least one processor 210 may perform a function corresponding to the icon of the received input. For example, in response to reception of input for the at least one second icon (e.g., a filter option icon) while the preview image is being displayed in the first area, the at least one processor 210 may display other multiple preview images, which are distinct from the preview image which is being displayed in the first image, in the second area. In various embodiments, the size of each of the other multiple preview images may be smaller than that of the preview image, which is being displayed in the first area. In various embodiments, the content of each of the other multiple preview images may correspond to the content of the preview image, which is being displayed in the first area. In various embodiments, some of the other multiple preview images may be acquired on the basis of applying a corresponding filter effect to the preview image (or the image to be acquired).

In various embodiments, in response to reception of input for selecting one preview image among the other multiple preview images, which are being displayed in the second area, the at least one processor 210 may display the selected preview image, which is being displayed in the second area, in a highlighted form using the flexible display 140, and may change the preview image, which is being displayed in the first area, to the selected preview image. The size of the selected preview image, which is displayed in the first area after the change may correspond to the size of the preview image, which was displayed in the first area before the change. The selected preview image, which is displayed in the first area after the change may be an image obtained by applying a filter effect to the preview image, which was displayed in the first area before the change.

In various embodiments, the at least one processor 210 may detect a face from an image, which is being acquired through the at least one camera 150. In various embodiments, on the basis of detecting the face from the image, the at least one processor 210 may display a preview image for the image, which is acquired through the at least one camera 150, using the display 160, which is distinct from the flexible display 140 and is exposed through at least one of the first housing 110 and the second housing 120. The electronic device 100 according to various embodiments may provide a preview image within a field of view of a user, who captures a selfie using the at least one camera 150 (e.g., the rear camera) having higher quality, by displaying the preview image through the display 160. In other words, in order to provide an enhanced user experience to the user who captures a selfie using the at least one camera 150, the electronic device 100 according to various embodiments may display the preview image using the display, which is distinct from the flexible display 140. In order to allow another user who is different from the user who performs the photographing using the electronic device 100 (i.e., the subject of the image to be acquired) to check the composition of the image to be acquired, the electronic device 100 according to various embodiments may display a preview image, acquired through the at least one camera, through the display 160. In other words, in order to provide an enhanced user experience to the other user who is to be included in an image acquired using the at least one camera 150, the electronic device 100 according to various embodiments may display the preview image using the display 160, which is distinct from the flexible display 140.

In various embodiments, on the basis of detecting a face from an image acquired through the at least one camera 150 of the electronic device 100, which is in the first orientation, the at least one processor 210 may display a preview image for the image, acquired through the at least one camera, using the display 160.

As described above, the electronic device 100 according to various embodiments may provide an enhanced user experience by changing the display location of the preview image on the basis of at least one of the orientation of the electronic device 100, the state of the electronic device 100, or the direction in which the at least one camera 150 of the electronic device 100 is pointed.

An electronic device (e.g., the electronic device 100) according to various embodiments may include: a first housing (e.g., the first housing 110) including a first face and a second face, which is a rear side of the first face; a second housing (e.g., the second housing 120) including a third face and a fourth face, which is a rear side of the third face; a folding part (e.g., the folding part 130) rotatably connecting the first housing and the second housing to each other; a flexible display (e.g., the flexible display 140) disposed on the first face and the third face across the folding part and including a first area corresponding to the first face and a second area corresponding to the third face; at least one camera (e.g., the at least one camera 150) exposed through at least a portion of the fourth face; at least one memory (e.g., the memory 220) configured to store instructions; and at least one processor (e.g., the at least one processor 210), wherein the at least one processor may be configured, when the instructions are executed, to: determine an orientation of the electronic device and a direction in which the at least one camera is pointed while a camera application is executed; identify at least one of the first area and the second area as an area in which a preview image acquired through the at least one camera is displayed based at least on the determined direction and the determined orientation; and display the preview image in the identified area using the flexible display.

In various embodiments, the at least one processor may be configured, when the instructions are executed, to: identify a direction of the at least one camera relative to a ground based on the determined direction and the determined orientation; display a preview image in the first area using the flexible display based on identifying that the direction of the at least one camera relative to the ground corresponds to a first direction; and display the preview image in the second area using the flexible display based on identifying that the direction of the at least one camera relative to the ground corresponds to a second direction, which is distinct from the first direction. In various embodiments, the at least one processor may be further configured, when the instructions are executed, to: display a capture icon for acquiring an image for the preview image in the second area using the flexible display while the preview image is being displayed in the first area, and acquire the image in response to reception of input for the capture icon. In various embodiments, the at least one processor may be further configured, when the instructions are executed, to display a thumbnail image for representing the image in the second area using the flexible display in response to acquisition of the image. In various embodiments, the at least one processor may be further configured, when the instructions are executed, to display at least one of: at least one first icon for selecting a type of the image, at least one second icon for selecting an effect to be applied to the image, or at least one third icon for adjusting the magnification of the image, together with the capture icon using the flexible display. For example, the at least one second icon may include a filter option icon for selecting an image filter to be applied to the image, and the at least one processor may be configured, when the instructions are executed, to: receive an input for the filter option icon while the preview image is being displayed in the first area; display other multiple preview images, which are distinct from the preview image, displayed in the first area, in the second area using the flexible display in response to reception of the input for the filter option icon, each of the other multiple preview images being acquired based on applying a corresponding filter effect to the image; and display the selected preview image, which is being displayed in the second area, in a highlighted form using the flexible display and change the preview image, which is being displayed in the first area, to the selected preview image in response to reception of input for selecting one preview image among the other multiple preview images.

In various embodiments, the first direction may be substantially perpendicular to the second direction.

In various embodiments, the folding part may include at least one sensor configured to acquire information on an angle between the first housing and the second housing, and the at least one processor may be configured, when the instructions are executed, to: identify the angle between the first housing and the second housing, which is detected using the at least one sensor; and identify at least one of the first area and the second area as an area in which a preview image acquired through the at least one camera is displayed based at least on each of the determined direction and the determined orientation.

In various embodiments, the electronic device may further include at least one sensor to be used for detecting an orientation of the electronic device, the at least one sensor being disposed inside at least one of the first housing and the second housing, and the at least one processor may be configured, when the instructions are executed, to: determine the orientation of the electronic device and the direction in which the at least one camera is pointed using the at least one sensor.

In various embodiments, the determined orientation may correspond to an orientation for acquiring an image for a landscape.

As described above, an electronic device (e.g., the electronic device 100) may include: a first housing (e.g., the first housing 110) including a first face and a second face, which faces away from the first face; a second housing (e.g., the second housing 120) including a third face and a fourth face, which faces away from the third face; a folding part (e.g., the folding part 130) rotatably connecting a side face of the first housing and a side face of the second housing, which faces the first housing, to each other; a flexible display (e.g., the flexible display 140) disposed on the first face and the third face across the folding part and including a first area corresponding to the first face and a second area corresponding to the third face; at least one camera (e.g., the at least one camera 150) exposed through at least a portion of the fourth face; at least one memory (e.g., the memory 220) configured to store instructions; and at least one processor (e.g., the at least one processor 210), wherein the at least one processor may be configured, when the instructions are executed, to: determine a direction in which the at least one camera is pointed while the camera application is executed; and display a preview image, acquired through the at least one camera, in the first area using the flexible display on the basis of identifying that the determined direction corresponds to one of the multiple reference directions.

In various embodiments, the at least one processor may be further configured, when the instructions are executed, to: display the preview image, acquired through the at least one camera, in the second area using the flexible display on the basis of identifying that the determined direction is different from the multiple reference directions.

In various embodiments, the at least one processor may be further configured, when the instructions are executed, to: display a capture icon for acquiring an image for the preview image, in the second area using the flexible display while the preview image is being displayed in the first area, and acquire the image in response to reception of input for the capture icon. In various embodiments, the at least one processor may be further configured, when the instructions are executed, to display a thumbnail image for representing the image in the second area using the flexible display in response to acquisition of the image. In various embodiments, the at least one processor may be further configured, when the instructions are executed, to display at least one of: at least one first icon for selecting a type of the image, at least one second icon for selecting an effect to be applied to the image, or at least one third icon for adjusting the magnification of the image, together with the capture icon using the flexible display. For example, the at least one second icon may include a filter option icon for selecting an image filter to be applied to the image, and the at least one processor may be configured, when the instructions are executed, to: receive an input for the filter option icon while the preview image is being displayed in the first area; display other multiple preview images, which are distinct from the preview image displayed in the first area, in the second area using the flexible display in response to reception of the input for the filter option icon, each of the other multiple preview images being acquired based on applying each filter effect to the image; and display the selected preview image, which is being displayed in the second area, in a highlighted form using the flexible display and change the preview image, which is being displayed in the first area, to the selected preview image in response to reception of input for selecting one preview image among the other multiple preview images.

In various embodiments, the at least one processor may be configured, when the instructions are executed, to identify that the determined direction corresponds to one of the multiple reference directions by identifying that the angle between the determined direction and the reference direction is within a reference range.

In various embodiments, the folding part may include at least one sensor (e.g., the second sensor 240) configured to acquire information on an angle between the first housing and the second housing, and the at least one processor may be configured, when the instructions are executed, to: identify whether the angle between the first housing and the second housing, which is detected using the at least one sensor is within a specified range; and display the preview image, acquired through the at least one camera, in the first area using the flexible display on the basis of identifying that the determined direction corresponds to one of the multiple reference directions.

In various embodiments, the electronic device may further include at least one sensor (e.g., the first sensor 230) used for detecting the orientation of the electronic device and disposed inside at least one of the first housing and the second housing, and the at least one processor may be configured, when the instructions are executed, to: determine a direction in which the at least one camera is pointed using the at least one sensor; identify whether the orientation of the electronic device detected using the at least one sensor corresponds to one of multiple specified orientations; and display the preview image, acquired through the at least one camera, in the first area using the flexible display on the basis of identifying that the determined direction corresponds to one of the multiple reference directions. For example, each of the multiple specified orientations may correspond to an orientation for acquiring an image for a landscape. As another example, the at least one sensor may include at least one of a gyro sensor, a geomagnetic sensor, or an infrared sensor.

In various embodiments, the electronic device may further include a display (e.g., the display 160) exposed through at least a portion of the second face, and the at least one processor may be further configured, when the instructions are executed, to detect a face from an image acquired through the at least one camera; and display a preview image for the image, acquired through the at least one camera, using the display on the basis of identifying that the orientation of the electronic device, which is detected through the at least one sensor, is different from the multiple specified orientations.

As described above, an electronic device (e.g., the electronic device 100) may include: a first housing (e.g., the first housing 110) including a first face and a second face, which faces away from the first face; a second housing (e.g., the second housing 120) including a third face and a fourth face, which faces away from the third face; a folding part (e.g., the folding part 130) rotatably connecting a side face of the first housing and a side face of the second housing, which faces the first housing, to each other; a flexible display (e.g., the flexible display 140) disposed on the first face and the third face across the folding part and including a first area corresponding to the first face and a second area corresponding to the third face; at least one camera (e.g., the at least one camera 150) exposed through at least a portion of the fourth face; at least one memory (e.g., the memory 220) configured to store instructions; and at least one processor (e.g., the at least one processor 210), wherein the at least one processor may be configured, when the instructions are executed, to: identify whether a direction in which the at least one camera is pointed is changed while a preview image acquired through the at least one camera is displayed in the second area using the flexible display; and move the preview image from the second area to the first area using the flexible display in response to an identification result.

In various embodiments, the at least one processor may be configured, when the instructions are executed, to: identify whether a direction in which the at least one camera is pointed is changed in the state in which the angle between the first housing and the second housing is within a specified range while the preview image is being displayed in the second area using the flexible display; and move the preview image from the second area to the first area using the flexible display in response to an identification result. For example, the preview image may be maintained in the first area when it is identified that the direction in which the at least one camera is pointed is changed in the state in which the angle between the first housing and the second housing is out of the specified range.

In various embodiments, the at least one processor may be configured, when the instructions are executed, to: identify whether the direction in which the at least one camera is pointed is changed from a first direction, which is different from the multiple reference directions to a second direction, which corresponds to one of the multiple reference directions while the preview image is being displayed in the second area using the flexible display; and move the preview image from the second area to the first area using the flexible display in response to an identification result.

In various embodiments, the at least one processor may be further configured, when the instructions are executed, to: display a capture icon for acquiring an image for the preview image, in the second area in response to moving the preview image to the first area; and acquire the image in response to reception of input for the capture icon.

In various embodiments, the electronic device may further include at least one sensor (e.g., the first sensor 230) used for detecting the orientation of the electronic device and disposed inside at least one of the first housing and the second housing, and the at least one processor may be configured, when the instructions are executed, to: identify whether a direction in which the at least one camera is pointed is changed in the state in which the orientation of the electronic device corresponds to one of the multiple orientations; and move the preview image from the second area to the first area using the flexible display in response to an identification result. For example, the preview image may be maintained in the first area when it is identified that the direction in which the at least one camera is pointed is changed in the state in which the orientation of the electronic device is different from the multiple specified orientations.

In various embodiments, the at least one processor may be further configured, when the instructions are executed, to display multiple items for photographing, in the second area after the preview image is moved to the first area.

Figure 6:
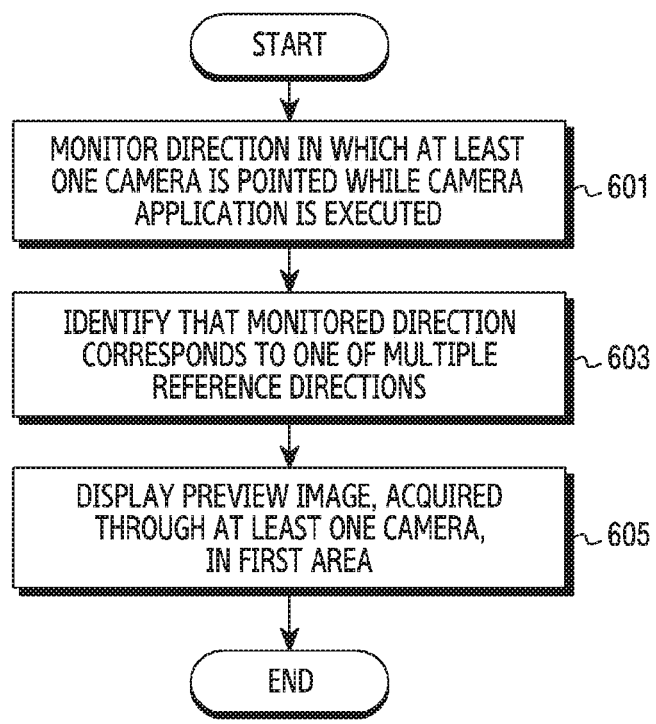
FIG. 6 illustrates an example of an operation of an electronic device according to an embodiment of the disclosure.

FIG. 6 illustrates an example of an operation of an electronic device according to an embodiment of the disclosure. Such an operation may be performed by the electronic device 100 illustrated in FIG. 1, the electronic device 100 illustrated in FIG. 2, or the at least one processor 210 illustrated in FIG. 2.

Referring to FIG. 6, in operation 601, the at least one processor 210 may determine the direction in which the at least one camera 150 is pointed during the execution of a camera application. In various embodiments, the execution of the camera application may be initiated by various methods. For example, the execution of the camera application may be initiated in response to reception of input on an icon for representing the camera application. As another example, the execution of the camera application may be initiated in response to reception of a specified input on a physical button included in the electronic device 100 (e.g., single-tap or double-tap). In another example, the execution of the camera application may be initiated in response to detection of a user's gesture for repeatedly changing the angle between the first housing 110 and the second housing 120 (e.g., a gesture of repeating an operation of unfolding and folding the electronic device 100 twice). In another example, the execution of the camera application may be initiated in response to reception of a specified voice signal (e.g., "Bixby, run the camera function"). However, the disclosure is not limited thereto.

In various embodiments, when the capacity of a rechargeable battery included in the electronic device 100 is below a threshold, the at least one processor 210 may activate the first sensor 230 in response to the execution of the camera application, and may monitor the direction in which the at least one camera 150 is pointed using the activated first sensor 230.

In operation 603, the at least one processor 210 may identify whether the monitored direction corresponds to one of the multiple reference directions. In various embodiments, the at least one processor 210 may identify whether the monitored direction corresponds to one of the multiple reference directions using various methods. For example, the at least one processor 210 may identify whether the monitored direction corresponds to one of the multiple reference directions by identifying whether the angle between the monitored direction and the reference direction is in a reference range (e.g., ranging from an angle $-\Phi-\psi$ to an angle $-\Phi$ in the graph 320 in FIG. 3).

In various embodiments, the at least one processor 210 may recognize that at least one camera 150 faces the ground on the basis of identifying that the monitored direction corresponds to one of the multiple reference directions.

Figure 7:
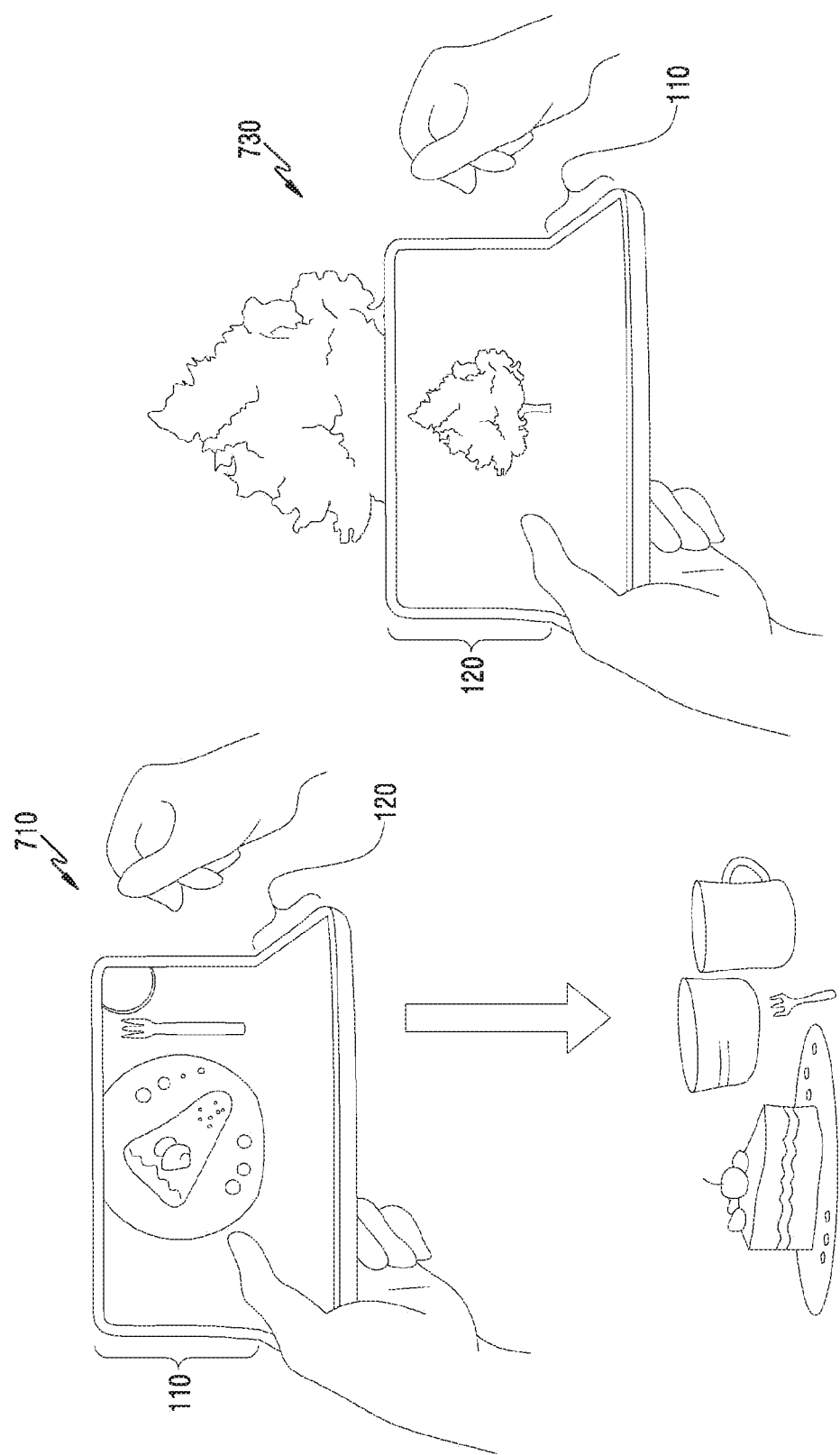
FIG. 7 illustrates an example of a state of an electronic device according to an embodiment of the disclosure.

FIG. 7 illustrates an example of a state of an electronic device according to an embodiment of the disclosure.

Referring to FIG. 7, the at least one processor 210 may recognize that at least one camera 150 is directed downward as in a state 710 on the basis of identifying that the monitored direction corresponds to one of the multiple reference directions. In other words, on the basis of identifying that the monitored direction corresponds to one of the multiple reference directions, the at least one processor 210 may recognize that the intension of the user is to acquire a photograph having an aerial view using the at least one camera 150.

In operation 605, on the basis of the identification described above, the at least one processor 210 may display a preview image, acquired through the at least one camera 150, in the first area among the total area of the flexible display 140. The electronic device 100 according to various embodiments may provide an enhanced user experience by displaying the preview image in the first area. For example, referring to FIG. 7, when the electronic device 100 is in the state 710, the at least one processor 210 may display the preview image in the first area instead of displaying the preview image in the second area such that the user is capable of capturing an image having an aerial view in a more comfortable posture.

In various embodiments, when another state 730, which is distinct from the state 710, exists, the at least one processor 210 may display the preview image in the second area, which is distinct from the first area. For example, while the electronic device 100 is in the state 730, the at least one processor 210 may display the preview image in the second area instead of displaying the preview image in the first area such that the user is capable of checking the preview image more conveniently.

In various embodiments, the at least one processor 210 may display the preview image in an area including the first area and the second area.

In various embodiments, the at least one processor 210 may control a remaining area among the entire display area on the basis of various methods while the preview image is being displayed in a partial area (e.g., the first area or the second area) among the entire display area of the flexible display 140.

For example, the at least one processor 210 may switch the state of the second area (or the first area) to an inactive state while the preview image is being displayed in the first area (or the second area). In various embodiments, the inactive state may be the state in which power supply to the pixels corresponding to the second area (or the first area) is restricted. In various embodiments, the inactive state may be the state in which a black screen is displayed in the second area (or the first area). In some embodiments, even if the state of the second area (or the first area) is switched to the inactive state, the touch sensor corresponding to the second area (or the first area) may be in the active state. The at least one processor 210 may receive an input using the touch sensor corresponding to the second area (or the first area) and in the active state, and may perform a function corresponding to the received input (e.g., acquisition of an image, a zoom-in function, or a zoom-out function).

Figure 8:
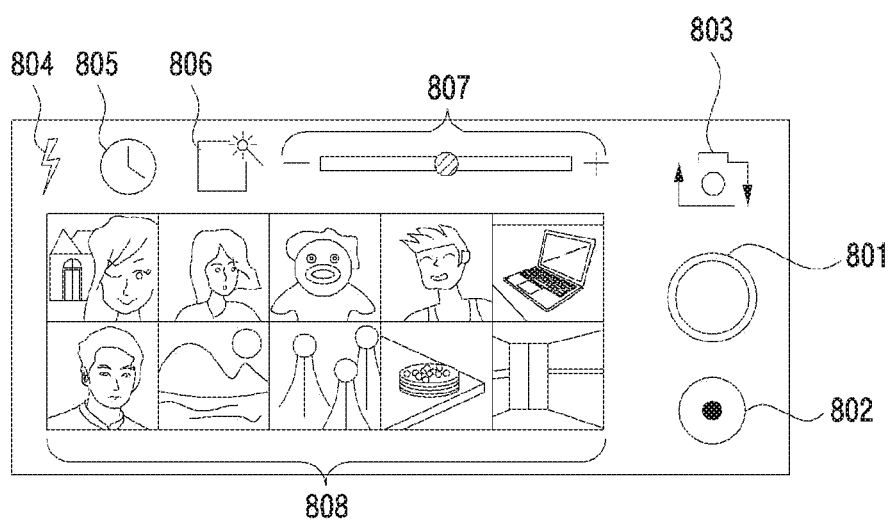
FIG. 8 illustrate an example of multiple icons displayed in a second area of a flexible display of an electronic device according to an embodiment of the disclosure.

FIG. 8 illustrate an example of multiple icons displayed in a second area of a flexible display of an electronic device according to an embodiment of the disclosure.

Referring to FIG. 8, the at least one processor 210 may display information, which is distinct from the preview image, in the second area (or the first area) while the preview image is being displayed in the first area (or the second area). For example, referring to FIG. 8, the at least one processor 210 may display at least one visual object related to image acquisition, in the second area (or the first area) while the preview image is being displayed in the first area (or the second area). For example, the at least one processor 210 may display a capture icon 801 in the second area (or the first area) while the preview image is being displayed in the first area (or the second area). As another example, the at least one processor 210 may display a recording icon 802 for acquiring a video image in the second area (or the first area) while the preview image is being displayed in the first area (or the second area). As another example, the at least one processor 210 may display a camera switch icon 803 for changing the camera to be used for photographing from the at least one camera 150 to another camera (e.g., the front camera), in the second area (or the first area) while the preview image is being displayed in the first area (or the second area). As another example, the at least one processor 210 may display a flash icon 804 for selecting whether to activate the flash function, in the second area (or the first area) while the preview image is being displayed in the first area (or the second area). As another example, the at least one processor 210 may display a timer icon 805 for selecting the length of a timer for automatic photographing in the second area (or the first area) while the preview image is being displayed in the first area (or the second area). As another example, the at least one processor 210 may display a filter option icon 806 for applying a filter effect to an image to be acquired in the second area (or the first area) while the preview image is being displayed in the first area (or the second area). As another example, the at least one processor 210 may display a magnification adjustment icon 807 for applying the magnification of an image to be acquired in the second area (or the first area) while the preview image is being displayed in the first area (or the second area). As another example, the at least one processor 210 may display at least one thumbnail image 808 for representing at least one recently acquired image in the second area (or the first area) while the preview image is being displayed in the first area (or the second area). However, the disclosure is not limited thereto.

As described above, the electronic device 100 according to various embodiments may recognize whether the at least one camera 150 faces the front side or faces the ground, and may adaptively change the area in which the preview image is displayed depending on the recognized result. Through the change, the electronic device 100 according to various embodiments is capable of providing an enhanced user experience.

Figure 9:
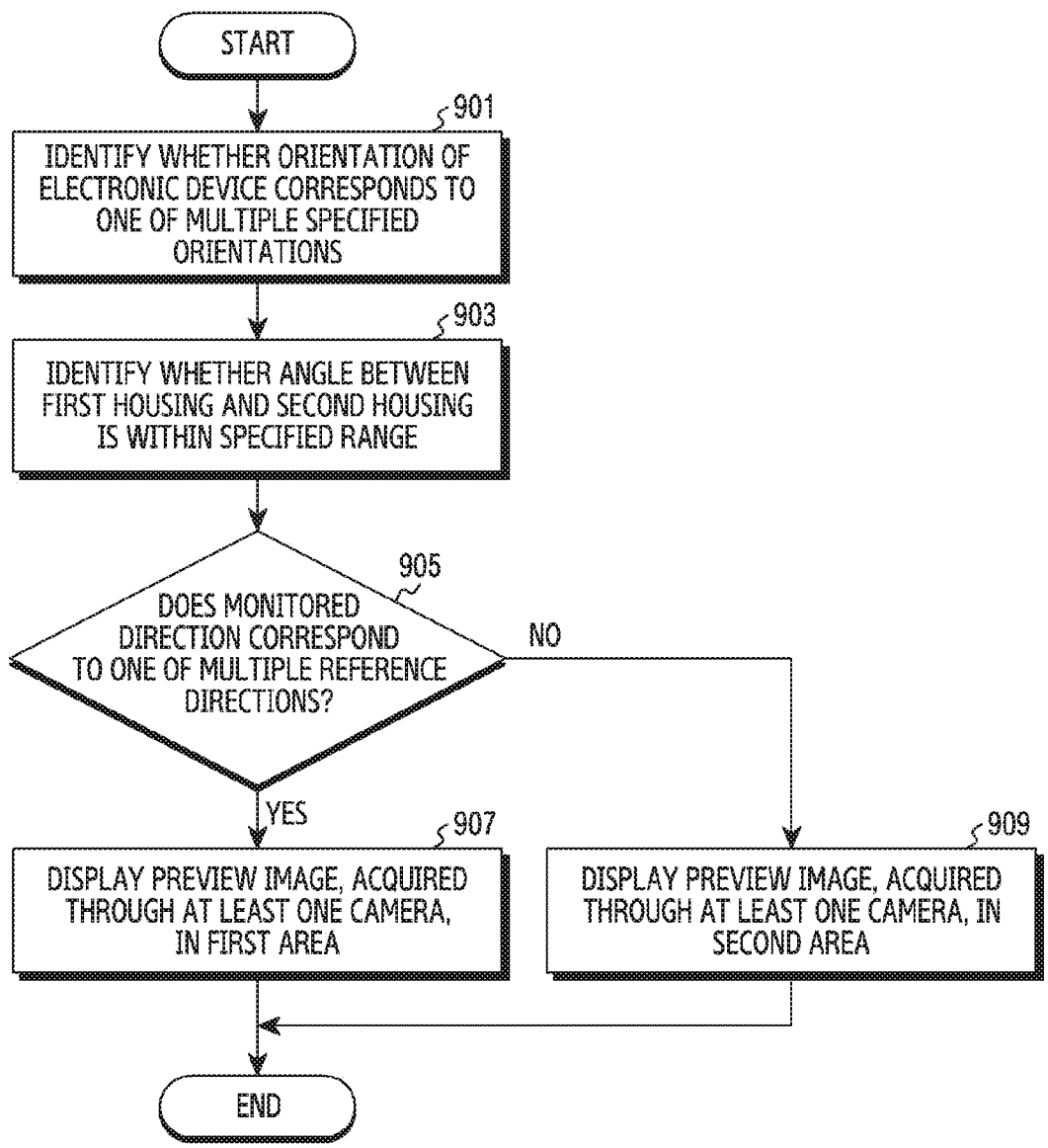
FIG. 9 illustrates an example of an operation of an electronic device that changes an area in which a preview image is displayed according to an embodiment of the disclosure.

FIG. 9 illustrates an example of an operation of an electronic device that changes an area in which a preview image is displayed according to an embodiment of the disclosure. Such an operation may be performed by the electronic device 100 illustrated in FIG. 1, the electronic device 100 illustrated in FIG. 2, or the at least one processor 210 illustrated in FIG. 2.

Operations 901 to 909 of FIG. 9 may be related to operation 603 and operation 605 of FIG. 6.

Referring to FIG. 9, in operation 901, the at least one processor 210 may identify whether the orientation of the electronic device 100 corresponds to one of the multiple reference directions. In various embodiments, the multiple specified orientations may be used to identify whether the electronic device 100 has an orientation for photographing a landscape. For example, the at least one processor 210 may recognize that the electronic device 100 has an orientation for photographing a landscape on the basis of identifying that the orientation of the electronic device 100 corresponds to one of the multiple specified orientations. As another example, the at least one processor 210 may recognize that the electronic device 100 has an orientation for photographing a portrait on the basis of identifying that the orientation of the electronic device 100 is different from all of the multiple specified orientations.

In operation 903, the at least one processor 210 may identify whether the angle between the first housing 110 and the second housing 120 is within a specified range. In various embodiments, the specified range may be used in order to identify whether the electronic device 100 is in the first state or in the second state. For example, the at least one processor 210 may recognize that the electronic device 100 is in the second state on the basis of identifying that the angle between the first housing 110 and the second housing 120 is within the specified range. As another example, the at least one processor 210 may recognize that the electronic device 100 is in the first state on the basis of identifying that the angle between the first housing 110 and the second housing 120 is out of the specified range.

In operation 905, the at least one processor 210 may identify whether the monitored direction of the at least one camera 150 corresponds to one of the multiple reference directions. When it is identified that the monitored direction corresponds to one of the multiple reference directions, the at least one processor 210 may perform operation 907. Unlike this, when it is identified that the monitored direction is different from all of the multiple reference directions, the at least one processor 210 may perform operation 909.

FIG. 9 illustrates an example in which the at least one processor 210 performs operation 905 after performing operation 901 and operation 903, but this is for convenience of description. For example, according to embodiments, the order of performing operation 901, operation 903, and operation 905 may be changed. As another example, according to embodiments, operation 901, operation 903, and operation 905 may be simultaneously performed.

In operation 907, in response to identifying that the monitored direction corresponds to one of the multiple reference directions, the at least one processor 210 may display a preview image, acquired through the at least one camera 150, in the first area. For example, the at least one processor 210 may identify whether the electronic device 100 is in the state 710 by performing operations 901 to 905, and, on the basis of the identification, the at least one processor 210 may display the preview image in the first area among the entire display area of the flexible display 140.

In operation 909, in response to identifying that the monitored direction is different from all of the multiple reference directions, the at least one processor 210 may display a preview image, acquired through the at least one camera 150, in the second area. For example, the at least one processor 210 may identify whether the electronic device 100 is in the state 730 by performing operations 901 to 905, and, on the basis of the identification, the at least one processor 210 may display the preview image in the second area among the entire display area of the flexible display 140.

As described above, the electronic device 100 according to various embodiments may adaptively change the area in which the preview image is displayed on the basis of the direction of the at least one camera 150 and the orientation of the electronic device 100, so that the user is capable of performing photography in a more comfortable posture. The electronic device 100 according to various embodiments may provide an image having higher quality since it is possible to provide a more comfortable photographing experience.

Figure 10:
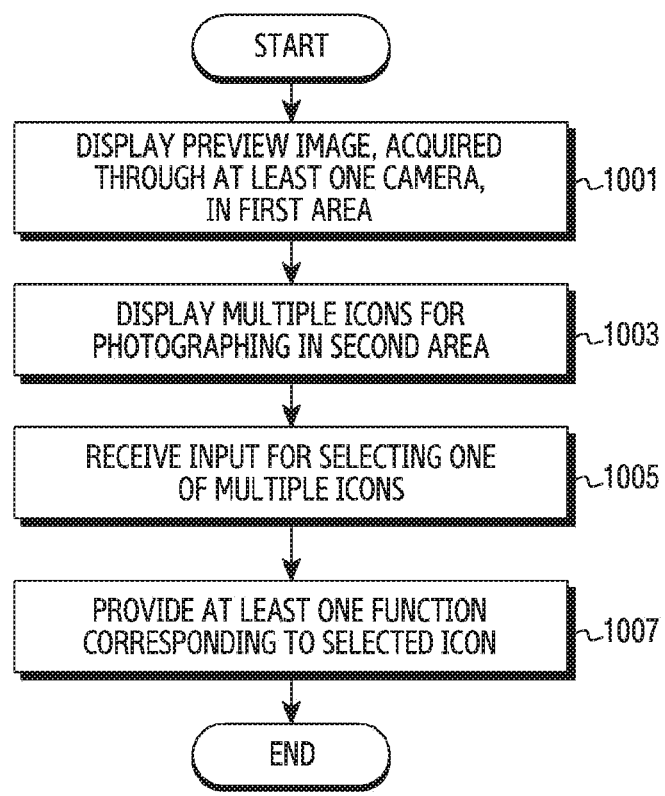
FIG. 10 illustrates an example of an operation of an electronic device that is performed while a preview image is displayed in a first area according to an embodiment of the disclosure.

FIG. 10 illustrates an example of an operation of an electronic device that is performed while a preview image is being displayed in a first area according to an embodiment of the disclosure. Such an operation may be performed by the electronic device 100 illustrated in FIG. 1, the electronic device 100 illustrated in FIG. 2, or the at least one processor 210 illustrated in FIG. 2.

Operations 1001 to 1007 of FIG. 10 may be related to operation 605 of FIG. 6.

Referring to FIG. 10, in operation 1001, the at least one processor 210 may display a preview image, acquired through the at least one camera 150, in the first area.

In operation 1003, while the preview image is being displayed in the first area, the at least one processor 210 may display multiple icons for photographing in the second area. For example, referring to FIG. 8, the multiple icons may include a capture icon 801, a recording icon 802, a camera switch icon 803, a flash icon 804, a timer icon 805, a filter option icon 806, a magnification adjustment icon 807, or at least one thumbnail image 808. The multiple icons may be displayed in response to displaying the preview image in the first area.

In operation 1005, the at least one processor 210 may receive an input for selecting one of the multiple icons. In various embodiments, the input may include one of a touch input, a voice input, or a gesture input.

In operation 1007, the at least one processor 210 may provide at least one function corresponding to the selected item.

Figure 11:
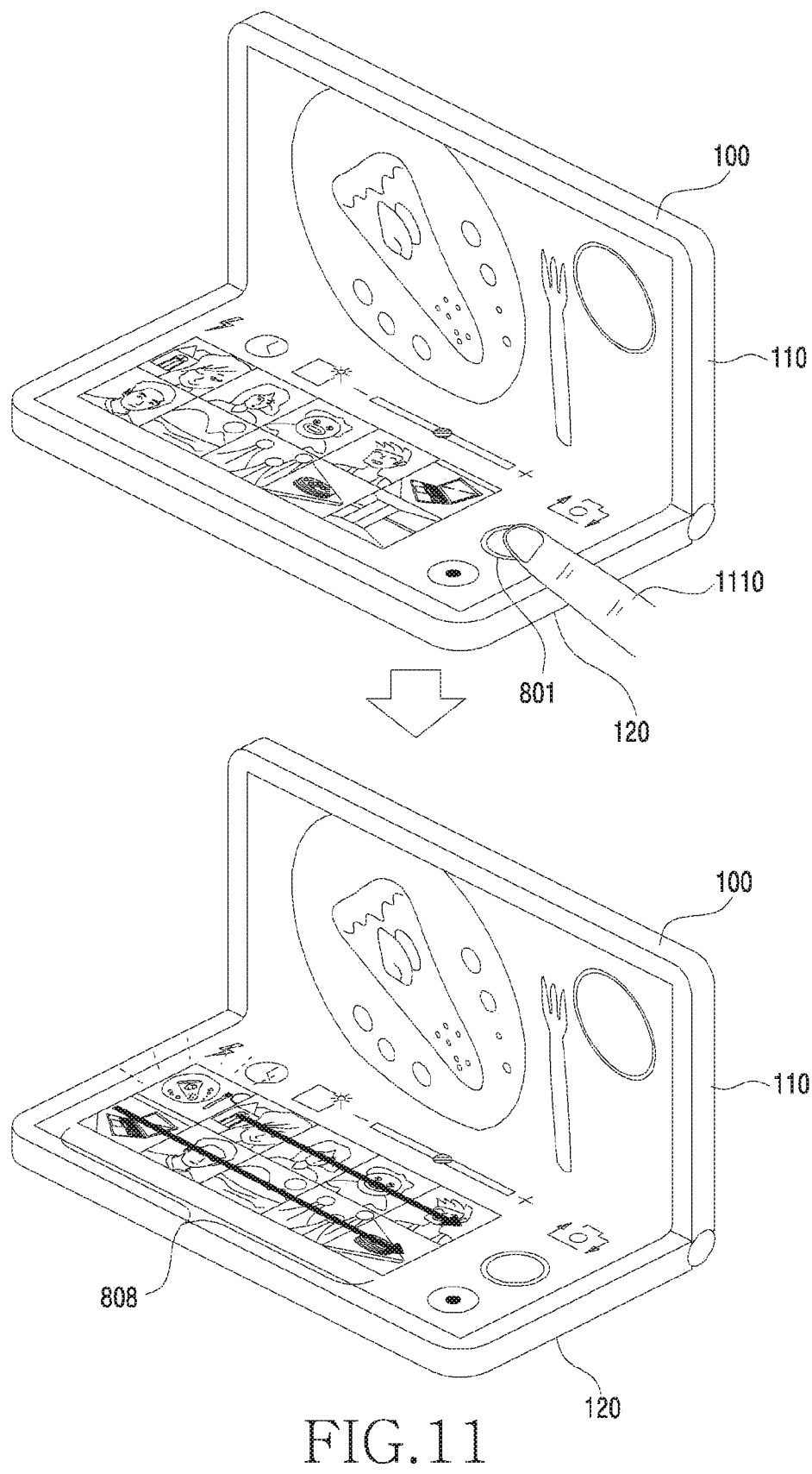
FIG. 11 illustrates an example of a function provided on the basis of an input with respect to icons displayed in a second area according to an embodiment of the disclosure.

FIG. 11 illustrates an example of a function provided on the basis of an input with respect to icons displayed in a second area according to an embodiment of the disclosure.

Referring to FIG. 11, the at least one processor 210 may display the preview image in the first area, and may receive an input 1110 for the capture icon 801 while the multiple icons are displayed in the second area. In response to reception of the input 1110, the at least one processor 210 may acquire an image for the preview image, which is being displayed in the first area. In response to obtaining the image, the at least one processor 210 may add a thumbnail image for representing the acquired image to the at least one thumbnail image 808, which is being displayed in the second area. In various embodiments, at least some of one or more thumbnail images 808 may disappear due to the addition of the thumbnail image.

Figure 12:
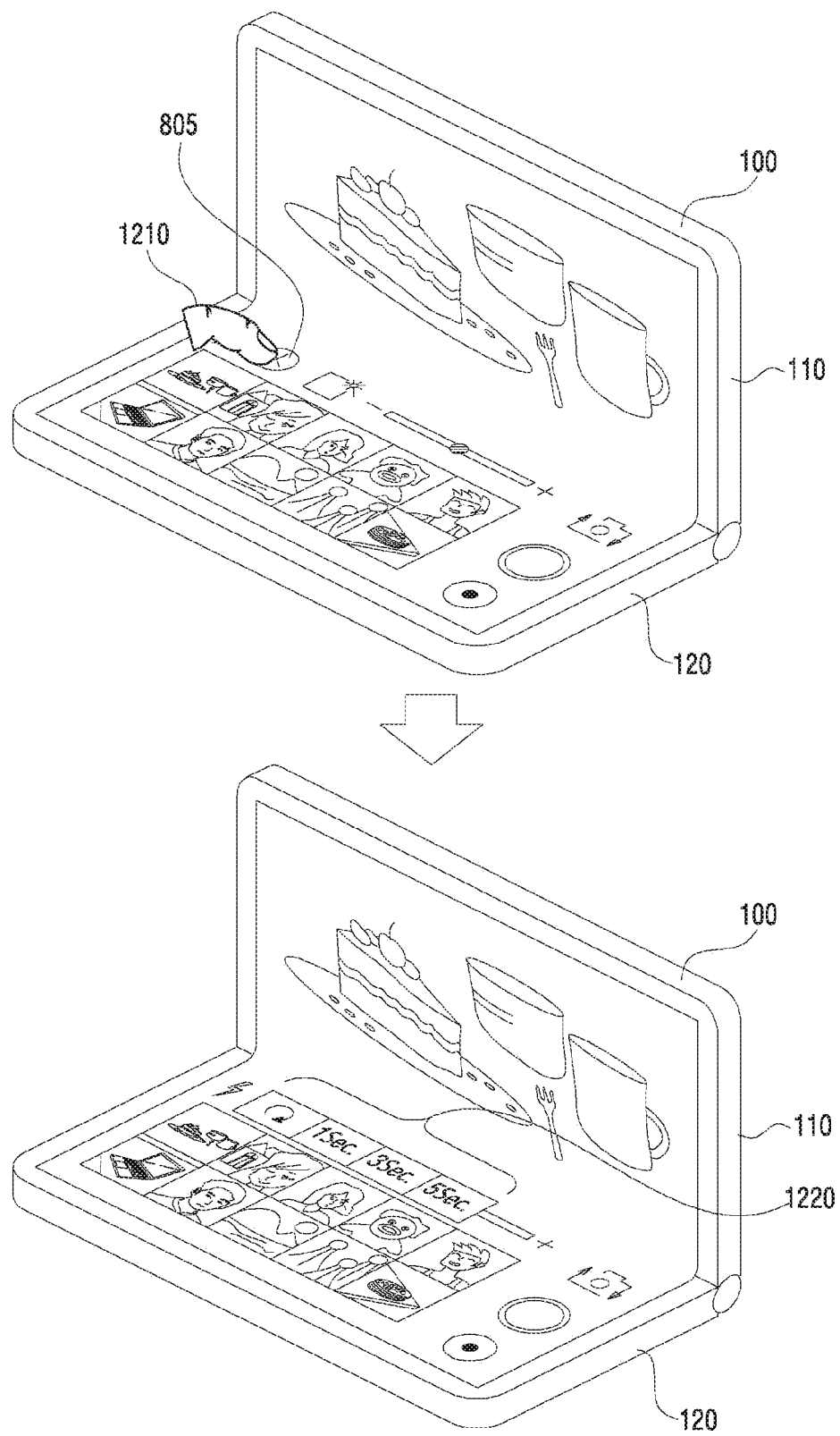
FIG. 12 illustrates another example of a function provided on the basis of an input with respect to icons displayed in a second area according to an embodiment of the disclosure.

FIG. 12 illustrates another example of a function provided on the basis of an input with respect to icons displayed in a second area according to an embodiment of the disclosure.

Referring to FIG. 12, the at least one processor 210 may display the preview image in the first area, and may receive an input 1210 for the timer icon 805 while the multiple icons are displayed in the second area. The at least one processor 210 may display the multiple items 1220 in response to reception of the input 1210. The multiple items 1220 may be used to set a time until automatic photographing is performed after receiving a photographing input. In some embodiments, the multiple items 1220 may be superimposed on at least some of the multiple icons.

Figure 13:
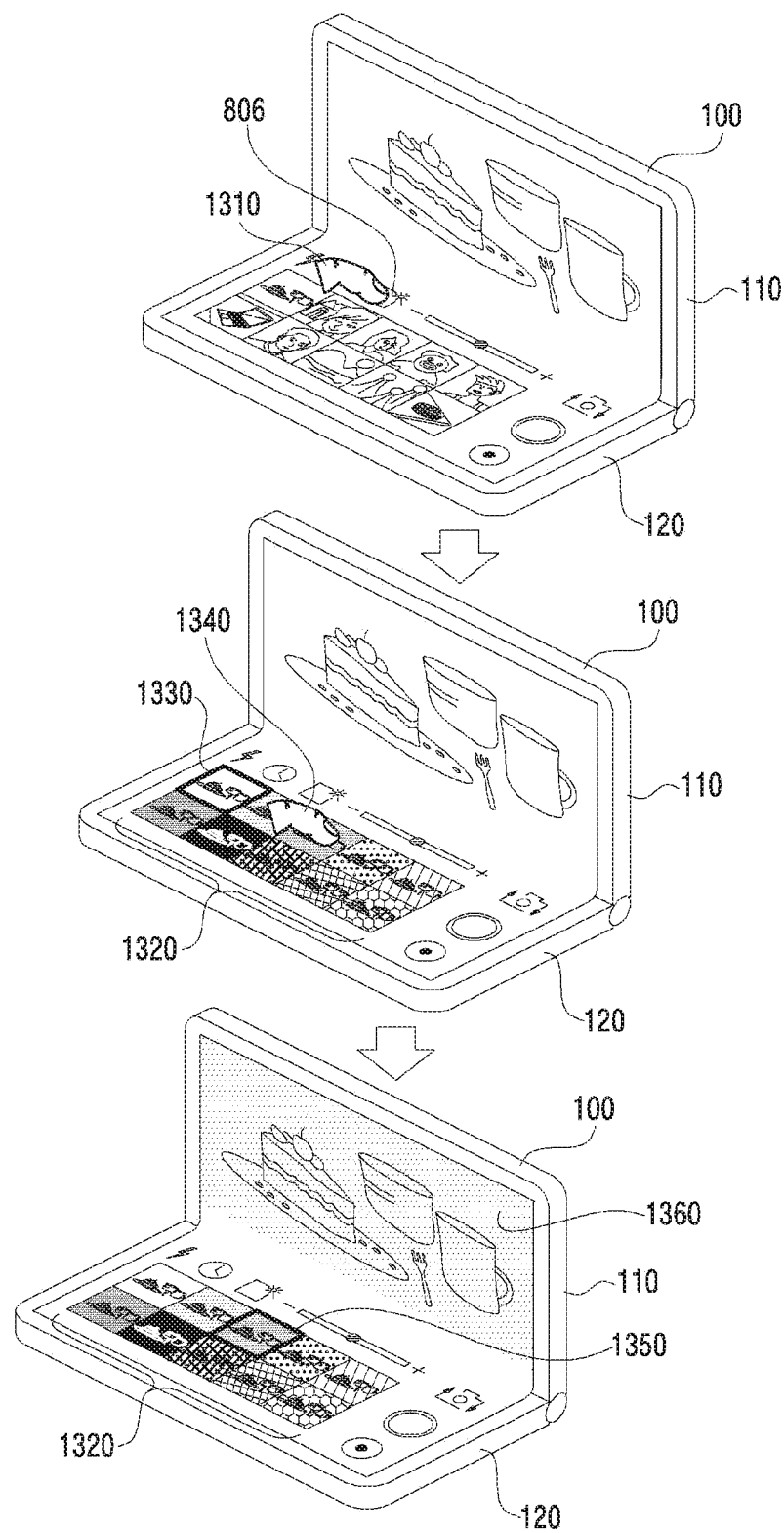
FIG. 13 illustrates still another example of a function provided on the basis of an input with respect to icons displayed in a second area according to an embodiment of the disclosure.

FIG. 13 illustrates still another example of a function provided on the basis of an input with respect to icons displayed in a second area according to an embodiment of the disclosure.

Referring to FIG. 13, the at least one processor 210 may display the preview image in the first area, and may receive an input 1310 for the filter option icon 806 while the multiple icons are displayed in the second area. The at least one processor 210 may display other multiple preview images 1320, which are distinct from the preview image, which is being displayed in the first area, in response to reception of the input 1310. A preview image 1330 for displaying an image, to which a filter effect is not applied among the other multiple preview images 1320, may be highlighted relative to the remaining preview images among the other preview images 1320 after receiving the input 1310. The at least one processor 210 may receive an input 1340 for selecting a preview image different from the preview image 1330 among the other multiple preview images 1320 during the display of the preview image 1330 in a highlighted form. In response to reception of the input 1340, the at least one processor 210 may display a preview image 1350 selected by the input 1340 as being highlighted relative to the remaining ones of the multiple preview images 1320. In response to reception of the input 1340, the at least one processor 210 may display a preview image 1360, corresponding to the preview image selected by the input 1340, in the first area.

Figure 14:
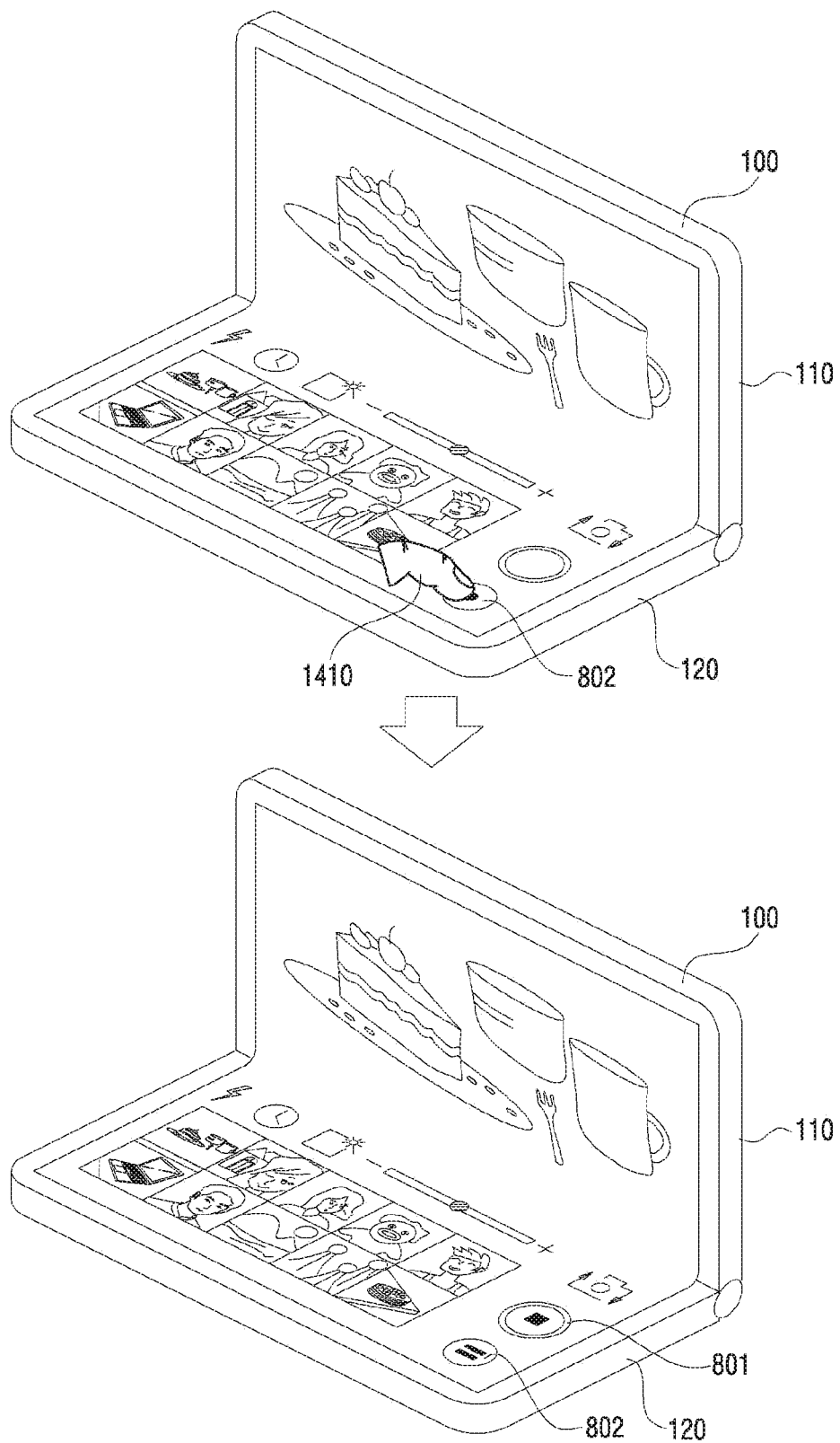
FIG. 14 illustrates another example of a function provided on the basis of an input with respect to icons displayed in a second area according to an embodiment of the disclosure.

FIG. 14 illustrates another example of a function provided on the basis of an input with respect to icons displayed in a second area according to an embodiment of the disclosure.

Referring to FIG. 14, the at least one processor 210 may display the preview image in the first area, and may receive an input 1410 for the recording icon 802 while the multiple icons are displayed in the second area. In response to reception of the input 1410, the at least one processor 210 may change the state of the capture icon 801 to the state of indicating that recording of a video image is performed. In response to reception of the input 1410, the at least one processor 210 may change the state of the recording icon 802 to the state of indicating a pause function. The at least one processor 210 may initiate capturing of a video image in response to reception of the input 1410.

Figure 15:
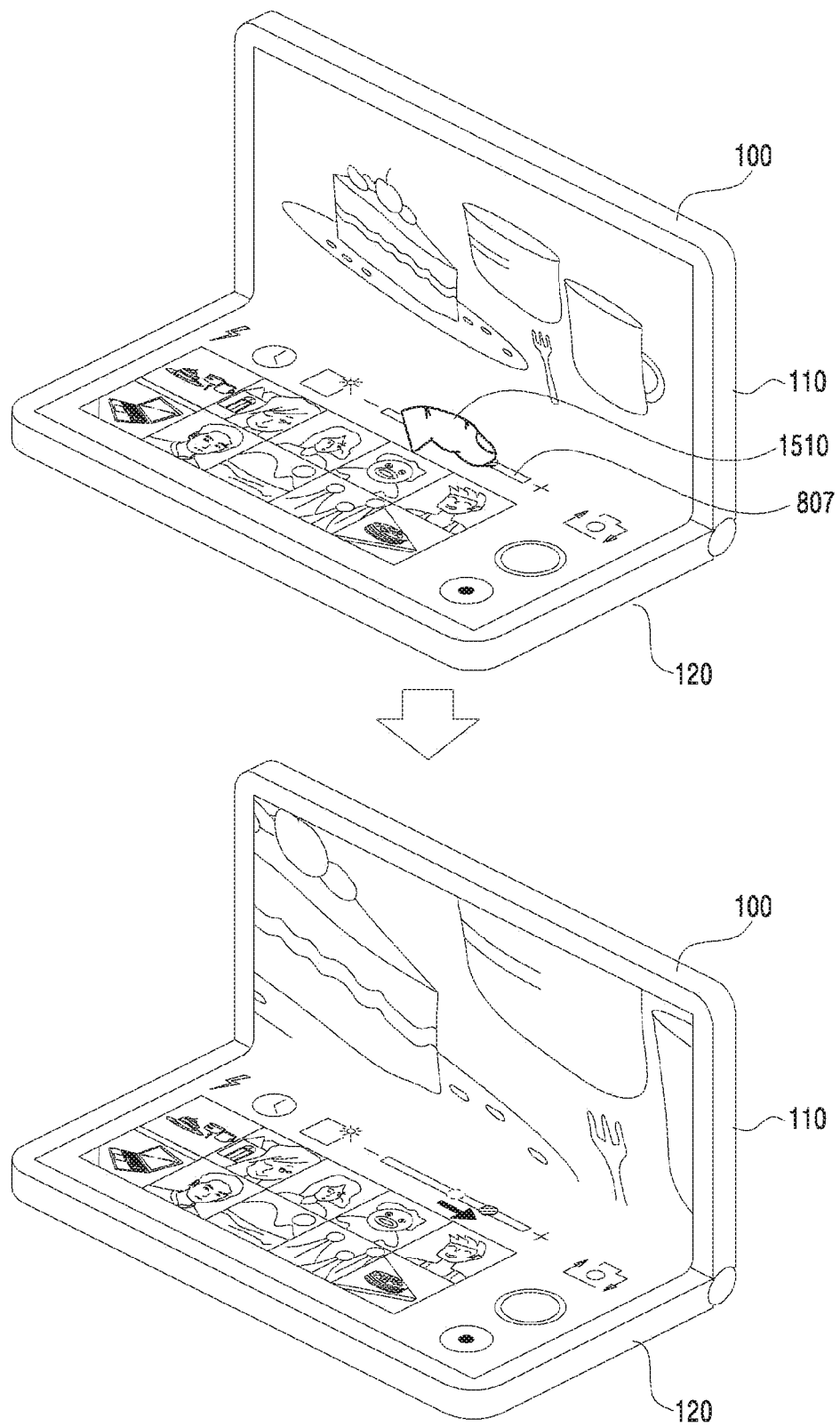
FIG. 15 illustrates another example of a function provided on the basis of an input with respect to icons displayed in a second area according to an embodiment of the disclosure.

FIG. 15 illustrates another example of a function provided on the basis of an input with respect to icons displayed in a second area according to an embodiment of the disclosure.

Referring to FIG. 15, the at least one processor 210 may display the preview image in the first area, and may receive an input 1510 for the magnification adjustment icon 807 while the multiple icons are displayed in the second area. In response to reception of the input 1510, the at least one processor 210 may change the magnification of the preview image, which is being displayed in the first area, to the magnification adjusted by the input 1510. In response to reception of the input 1510, the at least one processor 210 may change the state of the magnification adjustment icon 807 to the state of indicating the changed magnification.

FIGS. 10 to 15 illustrate an embodiment in which a preview image is displayed in the first area and the multiple icons are displayed in the second area. It shall be noted that the operations of the electronic device 100 described with reference to FIGS. 10 to 15 may also be applied to an embodiment in which a preview image is displayed in the second area and the multiple icons are displayed in the first area.

As described above, the electronic device 100 according to various embodiments may provide options for photographing in an area, which is distinct from an area in which a preview image is displayed, so that the preview image is not obscured by the user's finger or the like even if the options for photographing are selected. In other words, the electronic device 100 according to various embodiments is capable of providing an enhanced user experience while the photographing is performed.

Figure 16:
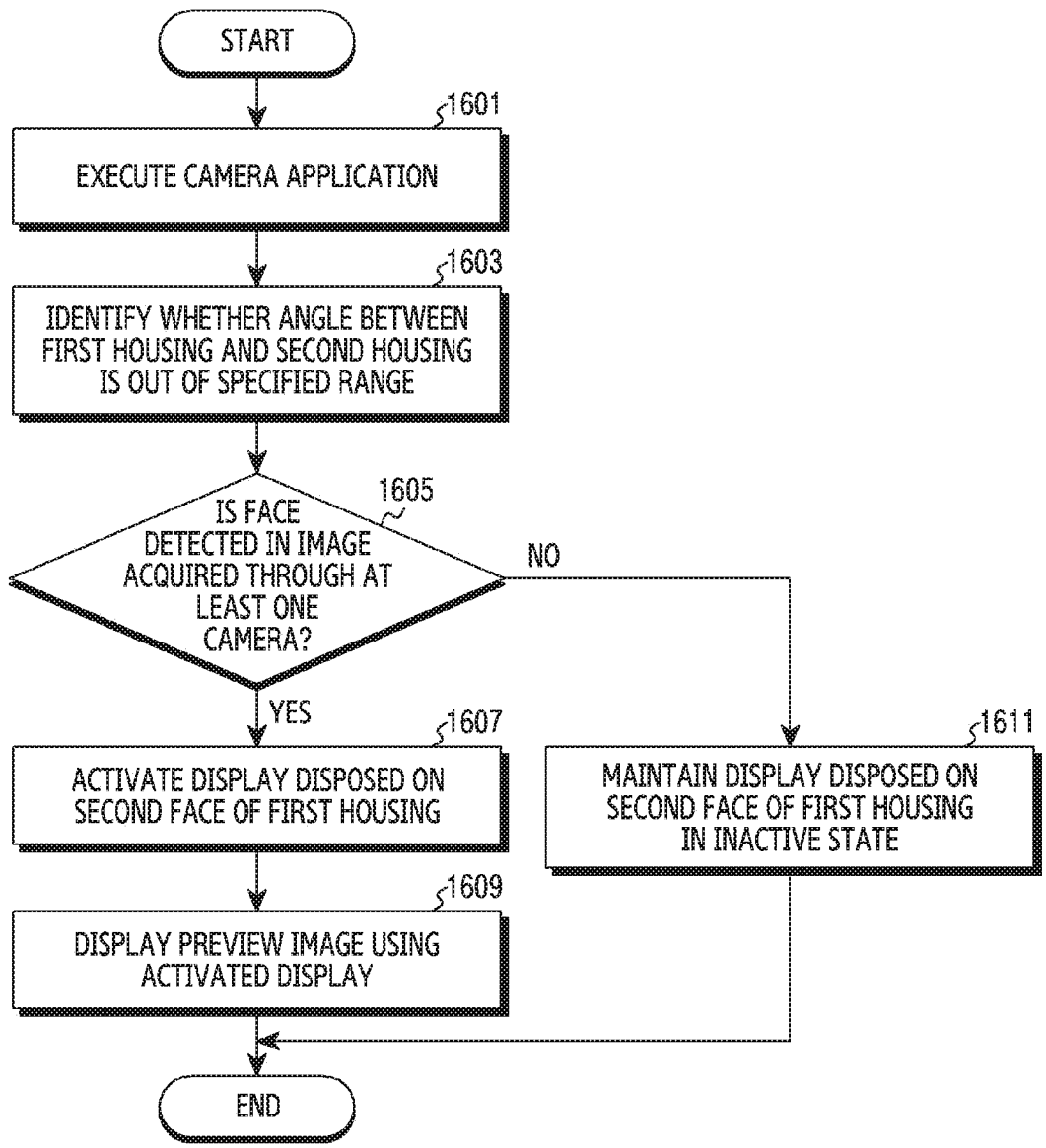
FIG. 16 illustrates an example of an operation of an electronic device that displays a preview image using a display disposed on a second face of a first housing according to an embodiment of the disclosure.

FIG. 16 illustrates an example of an operation of an electronic device that displays a preview image using a display disposed on a second face of a first housing according to an embodiment of the disclosure. Such an operation may be performed by the electronic device 100 illustrated in FIG. 1, the electronic device 100 illustrated in FIG. 2, or the at least one processor 210 illustrated in FIG. 2.

Referring to FIG. 16, in operation 1601, the at least one processor 210 may execute the camera application. For example, the at least one processor 210 may execute the camera application on the basis of user input or input received from an external device.

In operation 1603, the at least one processor 210 may identify whether the angle between the first housing 110 and the second housing 120 is out of the specified range. For example, the at least one processor 210 may recognize that the electronic device 100 is in the first state on the basis of identifying that the angle between the first housing 110 and the second housing 120 is out of the specified range.

In operation 1605, the at least one processor 210 may identify whether to detect a face from an image acquired through the at least one camera 150 on the basis of the identification. When detecting a face from the image acquired through the at least one camera 150, the at least one processor 210 may perform operations 1607 and 1609. Unlike this, when no face is detected in the image acquired through the at least one camera 150, the at least one processor 210 may perform operation 1611.

In operation 1607, the at least one processor 210 may activate the display 160 disposed on the second face of the first housing 110 on the basis of identifying that a face is detected in the image acquired through the at least one camera 150. When the display 160 has already been activated when identifying that a face is detected in the image acquired through the at least one camera 150, operation 1607 may be skipped or bypassed.

In operation 1609, the at least one processor 210 may display a preview image for an image acquired through the at least one camera 150 using the activated display 160. The electronic device 100 according to various embodiments may provide a preview image within a field of view of a user, who captures a selfie using the at least one camera 150 (e.g., the rear camera) having higher quality, by displaying the preview image through the display 160. In other words, in order to provide an enhanced user experience to the user who captures a selfie using the at least one camera 150, the electronic device 100 according to various embodiments may display the preview image using the display 160, which is distinct from the flexible display 140. In order to allow another user who is different from the user who performs the photographing using the electronic device 100 (i.e., the subject of the image to be acquired) to check the composition of the image to be acquired, the electronic device 100 according to various embodiments may display a preview image, acquired through the at least one camera 150, through the display 160. In other words, in order to provide an enhanced user experience to the other user who is to be included in an image acquired using the at least one camera 150, the electronic device 100 according to various embodiments may display the preview image using the display 160, which is distinct from the flexible display 140.

In operation 1611, the at least one processor 210 may maintain the state of the display 160 disposed on the second face of the first housing 110 in the inactive state on the basis of identifying that no face is detected in the image acquired through the at least one camera 150. In various embodiments, when the display 160 is in the active state, the at least one processor 210 may switch the state of the display 160 disposed on the second face of the first housing 110 into the inactive state on the basis of identifying that no face is detected in the image acquired through the at least one camera 150. According to various embodiments, it is possible to reduce the power consumed by the electronic device 100 making the display 160 of the electronic device 100 remain in the inactive state.

Figure 17:
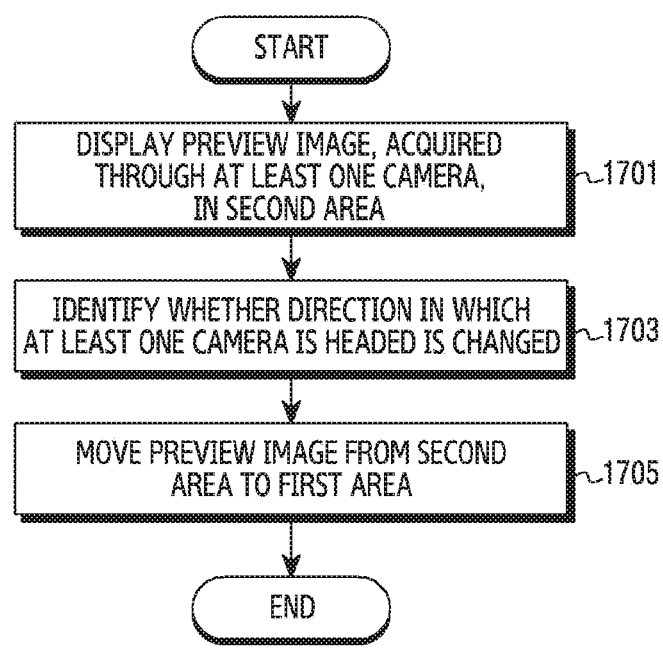
FIG. 17 illustrates another example of an operation of an electronic device according to an embodiment of the disclosure.

FIG. 17 illustrates another example of an operation of an electronic device according to an embodiment of the disclosure. Such an operation may be performed by the electronic device 100 illustrated in FIG. 1, the electronic device 100 illustrated in FIG. 2, or the at least one processor 210 illustrated in FIG. 2.

Referring to FIG. 17, in operation 1701, the at least one processor 210 may display a preview image, acquired through the at least one camera 150, in the second area. For example, the at least one processor 210 may recognize that the at least one camera 150 is directed forward using at least one of the first sensor 230 and the second sensor 240. On the basis of the recognition, the at least one processor 210 may display a preview image, acquired through the at least one camera 150, in the second area.

In operation 1703, the at least one processor 210 may identify whether the direction in which the at least one camera 150 is pointed is changed while the preview image is being displayed in the second area. For example, while the preview image is being displayed in the second area, the at least one processor 210 may identify that the direction in which the at least one camera 150 is pointed is changed from a first direction, which is different from the multiple reference directions, to a second direction, which corresponds to one of the multiple reference directions. In other words, the at least one processor 210 may recognize that the at least one camera 150 is facing the ground when the direction in which the at least one camera 150 is pointed changes.

In operation 1705, on the basis of the identification, the at least one processor 210 may move the preview image from the second region to the first region. For example, the at least one processor 210 may move the preview image from the second area to the first area by recognizing that the state of the electronic device 100 is changed to the state 710.

In various embodiments, when it is identified that the direction in which the at least one camera 150 is pointed is changed in the state in which the orientation of electronic device 100 is different from the multiple specified orientations, the at least one processor 210 may maintain the preview image in the first area independently from operation 1705. In other words, when the electronic device 100 is in another state distinct from the state 710, the at least one processor 210 may maintain the preview image in the first area by not performing operation 1705.

As described above, in the electronic device 100 according to various embodiments, when the direction in which the at least one camera 150 is pointed is changed according to a change in the orientation of the electronic device 100, the area in which a preview image is displayed may be changed. The electronic device 100 according to various embodiments may provide an enhanced user experience by changing the area in which the preview image is displayed.

Figure 18:
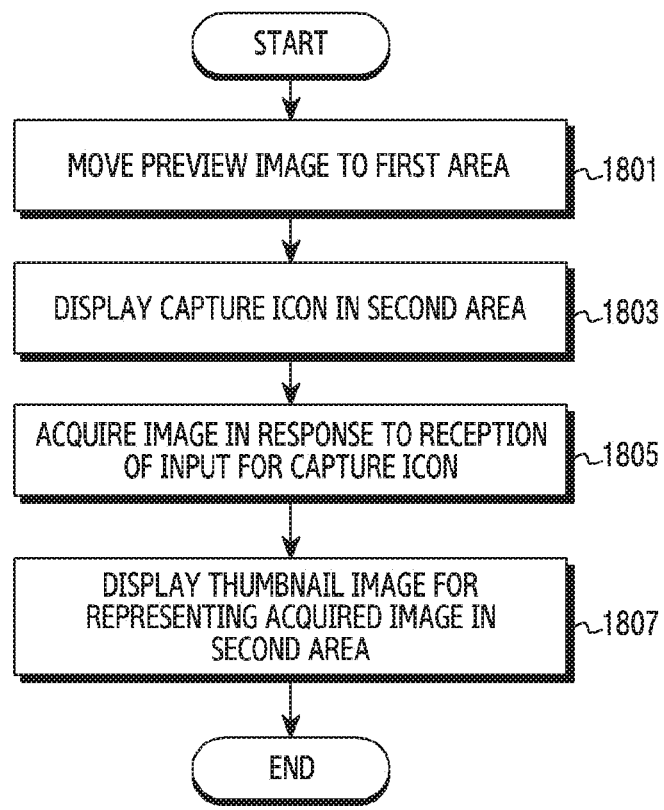
FIG. 18 illustrates an example of an operation of an electronic device that acquires an image after moving a preview image to a first area according to an embodiment of the disclosure.

FIG. 18 illustrates an example of an operation of an electronic device that acquires an image after moving a preview image to a first area according to an embodiment of the disclosure. Such an operation may be performed by the electronic device 100 illustrated in FIG. 1, the electronic device 100 illustrated in FIG. 2, or the at least one processor 210 illustrated in FIG. 2.

Operations 1801 to 1807 of FIG. 18 may be related to operation 1705 of FIG. 17.

Referring to FIG. 18, in operation 1801, the at least one processor 210 may move the preview image to the first area on the basis of the change in the direction of the at least one camera 150.

In operation 1803, the at least one processor 210 may display the capture icon in the second area based at least on a change in the direction of the at least one camera 150 or the movement of the preview image to the first area. While the preview image is being displayed in the first area, the user may grip the second housing 120 instead of the first housing 110 corresponding to the first area. Thus, the at least one processor 210 may display the capture icon in the second area corresponding to the second housing 120 gripped by the user.

In operation 1805, in response to reception of input for the capture icon, the at least one processor 210 may acquire the image for the preview image. The acquired image may be stored in the memory 220.

In operation 1807, on the basis of the acquisition of the image, the at least one processor 210 may display a thumbnail image for representing the acquired image, in the second area. For example, the thumbnail image may be displayed in the second area together with the capture icon.

As described above, the electronic device 100 according to various embodiments may provide a capture icon in an area, which is distinct from the area in which the preview image is displayed. By providing the capture icon, the electronic device 100 according to various embodiments is able to prevent photographing from being performed in the state in which a preview image is obscured by the user's finger or the like.

A method of operating an electronic device including a flexible display extending across a first housing and a second housing as described above may include: determining an orientation of the electronic device and a direction in which at least one camera, which is exposed through at least a portion of the first housing of the electronic device, is pointed during the execution of a camera application; identifying at least one of the first area corresponding to the first housing and the second area corresponding to the second housing as an area in which a preview image acquired through the at least one camera is displayed based at least on the determined direction and the determined orientation; and displaying the preview image in the identified area.

In various embodiments, the displaying the preview image may include; identifying a direction of the at least one camera relative to a ground based on the determined direction and the determined orientation; displaying a preview image, acquired in the first area using the flexible display based on identifying that the direction of the at least one camera relative to the ground corresponds to a first direction; and displaying the preview image, acquired through the at least one camera, in the second area using the flexible display based on identifying that the direction of the at least one camera relative to the ground corresponds to a second direction, which is distinct from the first direction. In various embodiments, the method may further include displaying a capture icon for acquiring an image for the preview image, in the second area using the flexible display while the preview image is being displayed in the first area, and acquiring the image in response to reception of input for the capture icon. In various embodiments, the method may further include displaying a thumbnail image for representing the image in the second area using the flexible display in response to acquisition of the image. In various embodiments, the method may further include displaying at least one of: at least one first icon for selecting a type of the image, at least one second icon for selecting an effect to be applied to the image, or at least one third icon for adjusting the magnification of the image, together with the capture icon using the flexible display. For example, the at least one second icon may include a filter option icon for selecting an image filter to be applied to the image, and the method may further include: receiving an input for the filter option icon while the preview image is being displayed in the first area; displaying other multiple preview images, which are distinct from the preview image displayed in the first area, in the second area using the flexible display in response to reception of the input for the filter option icon, each of the other multiple preview images being acquired based on applying a corresponding filter effect to the image; and displaying the selected preview image, which is being displayed in the second area, in a highlighted form using the flexible display and changing the preview image, which is being displayed in the first area, to the selected preview image in response to reception of input for selecting one preview image among the other multiple preview images.

In various embodiments, the first direction may be substantially perpendicular to the second direction.

In various embodiments, the displaying the preview image includes; identifying the angle between the first housing and the second housing, which is detected using the at least one sensor; and indicating at least one of the first area and the second area as an area in which a preview image acquired through the at least one camera is displayed based at least on each of the determined direction and the determined orientation. In various embodiments, the determined orientation may correspond to an orientation for acquiring an image for a landscape.

A method of operating an electronic device (e.g., the electronic device 100) according to various embodiments described above may include: monitoring a direction in which at least one camera (e.g., the at least one camera 150) exposed through at least a portion of the first housing (e.g., the second housing 120) of the electronic device is pointed during the execution of a camera application; and displaying a preview image, acquired through the at least one camera, in a display area corresponding to the second housing (e.g., the first housing 110) of the electronic device, which is distinct from the first housing, among the entire display area of the flexible display of the electronic device on the basis of identifying that the monitored direction corresponds to one of the multiple reference directions.

In various embodiments, the method may further include displaying the preview image, acquired through the at least one camera, in the second area using the flexible display on the basis of identifying that the monitored direction is different from the multiple reference directions.

In various embodiments, the method may further include: displaying a capture icon for acquiring an image for the preview image, in the second area using the flexible display while the preview image is being displayed in the first area; and acquiring the image in response to reception of input for the capture icon. In various embodiments, the method may further include displaying a thumbnail image for representing the image in the second area using the flexible display in response to acquisition of the image. In various embodiments, the method may further include displaying at least one of: at least one first icon for selecting a type of the image, at least one second icon for selecting an effect to be applied to the image, or at least one third icon for adjusting the magnification of the image, together with the capture icon using the flexible display. For example, the at least one second icon may include a filter option icon for selecting an image filter to be applied to the image, and the method may further include: receiving an input for the filter option icon while the preview image is being displayed in the first area; displaying other multiple preview images, which are distinct from the preview image displayed in the first area, in the second area using the flexible display in response to reception of the input for the filter option icon; and displaying the selected preview image, which is being displayed in the second area, in a highlighted form using the flexible display and changing the preview image, which is being displayed in the first area, to the selected preview image in response to reception of input for selecting one preview image among the other multiple preview images, wherein each of the multiple other preview images may be acquired on the basis of applying a corresponding effect to the image.

In various embodiments, the identifying that the monitored direction corresponds to one of the multiple reference directions may include identifying that the monitored direction corresponds to one of the multiple reference directions by identifying that the angle between the monitored direction and the reference direction is within a reference range.

In various embodiments, the displaying the preview image in the first area may include: identifying whether the angle between the first housing and the second housing, which is detected using the at least one sensor included in the folding part of the electronic device, is within a specified range; and displaying the preview image, acquired through the at least one camera, in the first area using the flexible display on the basis of identifying that the monitored direction corresponds to one of the multiple reference directions.

In various embodiments, the monitoring the direction may include monitoring the direction in which the at least one camera is pointed using the at least one sensor of the electronic device, the displaying the preview image in the first area may include identifying whether the orientation of the electronic device, which is detected using the at least one sensor, corresponds to one of the multiple specified orientations; and displaying the preview image, acquired through the at least one camera, in the first area using the flexible display on the basis of identifying that the monitored direction corresponds to one of the multiple reference directions. In various embodiments, each of the multiple specified orientations may correspond to an orientation for acquiring an image for a landscape. In various embodiments, the at least one sensor may include at least one of a gyro sensor, a geomagnetic sensor, or an infrared sensor.

In various embodiments, the method may further include: detecting a face from an image acquired through the at least one camera; and displaying a preview image for the image, acquired through the at least one camera using a display, which is distinct from the flexible display, on the basis of identifying that the orientation of the electronic device, which is detected through the at least one sensor, is different from the multiple specified orientations.

A method of operating an electronic device according to various embodiments described above may include: identifying whether a direction in which at least one camera exposed through at least a portion of the first housing of the electronic device is pointed is changed while a preview image, acquired through the at least one camera, is displayed in an area corresponding to the first housing among the total area of a flexible display of the electronic device; and moving the preview image from the area corresponding to the first housing to an area corresponding to the second housing of the electronic device, which is distinct from the first housing, among the entire display area of the flexible display in response to an identification result.

In various embodiments, the moving the preview image to the first area may include identifying whether the direction in which the at least one camera is pointed is changed in the state in which the angle between the first housing and the second housing is within a specified range while the preview image is being displayed in the second area using the flexible display is changed; and moving the preview image from the second area to the first area using the flexible display in response to an identification result. In various embodiments, the preview image may be maintained in the first area when it is identified that the direction in which the at least one camera is pointed is changed in the state in which the angle between the first housing and the second housing is out of the specified range.

In various embodiments, the moving the preview image to the first area may including: identifying whether the direction in which the at least one camera is pointed is changed from a first direction, which is different from the multiple reference directions to a second direction, which corresponds to one of the multiple reference directions while the preview image is being displayed in the second area using the flexible display; and moving the preview image from the second area to the first area using the flexible display in response to an identification result.

In various embodiments, the method may further include: displaying a capture icon for acquiring an image for the preview image, in the second area in response to moving the preview image to the first area; and acquiring the image in response to reception of input for the capture icon.

In various embodiments, the moving the preview image to the first area may include identifying whether the direction in which the at least one camera is pointed is changed in the state in which the orientation of the electronic device corresponds to one of the multiple specified orientations; and moving the preview image from the second area to the first area using the flexible display in response to an identification result. In various embodiments, the preview image may be maintained in the first area when it is identified that the direction in which the at least one camera is pointed is changed in the state in which the orientation of the electronic device is different from the multiple specified orientations.

In various embodiments, the method may further include displaying multiple items for photographing in the second area after the preview image is moved to the first area.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which is accessible through communication networks such as the Internet, Intranet, Local Area Network (LAN), Wide Area Network (WAN), and Storage Area Network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a first housing including a first face and a second face, the second face being a rear side of the first face;
    a second housing including a third face and a fourth face, the fourth face being a rear side of the third face;
    a folding part rotatably connecting the first housing and the second housing to each other;
    a flexible display disposed on the first face and the third face across the folding part and including a first area corresponding to the first face and a second area corresponding to the third face;
    at least one camera exposed through at least a portion of the fourth face;
    at least one memory configured to store instructions; and
    at least one processor,
    wherein the at least one processor is configured, when the instructions are executed, to:
        determine an orientation of the electronic device based on a first angle between the first housing and a ground,
        determine a direction of the at least one camera relative to the ground in which the at least one camera is pointed while a camera application is executed based on the determined orientation and a second angle between the first housing and the second housing, identify at least one of the first area or the second area as an area in which a preview image acquired through the at least one camera is to be displayed based at least on the determined direction and the determined orientation, and display the preview image, acquired through the at least one camera, in the identified area using the flexible display.

2. The electronic device of claim 1, wherein the at least one processor is further configured, when the instructions are executed, to:

display a preview image, acquired through the at least one camera, in the first area using the flexible display based on identifying that the direction of the at least one camera relative to the ground corresponds to a first direction, and display the preview image, acquired through the at least one camera, in the second area using the flexible display based on identifying that the direction of the at least one camera relative to the ground corresponds to a second direction, which is distinct from the first direction.

3. The electronic device of claim 2, wherein the at least one processor is further configured, when the instructions are executed, to:

display a capture icon for acquiring an image for the preview image in the second area using the flexible display while the preview image is being displayed in the first area, and acquire the image in response to reception of input for the capture icon.

4. The electronic device of claim 3, wherein the at least one processor is further configured, when the instructions are executed, to:

display a thumbnail image for representing the image in the second area using the flexible display in response to acquisition of the image.

5. The electronic device of claim 3, wherein the at least one processor is further configured, when the instructions are executed, to:

display at least one of: at least one first icon for selecting a type of the image, at least one second icon for selecting an effect to be applied to the image, or at least one third icon for adjusting a magnification of the image, together with the capture icon using the flexible display.

6. The electronic device of claim 5, wherein the at least one second icon includes a filter option icon for selecting an image filter to be applied to the image, and wherein the at least one processor is further configured, when the instructions are executed, to:

receive an input for the filter option icon while the preview image is being displayed in the first area, display other multiple preview images, which are distinct from the preview image displayed in the first area, in the second area using the flexible display in response to reception of the input for the filter option icon, each of the other multiple preview images being acquired based on applying a corresponding filter effect to the image, and display the preview image, which is being displayed in the second area, in a highlighted form using the flexible display and change the preview image, which is being displayed in the first area, to the selected preview image in response to reception of input for selecting one preview image among the other multiple preview images.

7. The electronic device of claim 2, wherein the first direction is substantially perpendicular to the second direction.

8. The electronic device of claim 1, wherein the folding part includes at least one sensor configured to acquire information on the second angle between the first housing and the second housing, and wherein the at least one processor is further configured, when the instructions are executed, to:

identify the second angle between the first housing and the second housing, which is detected using the at least one sensor, and identify at least one of the first area or the second area as an area in which a preview image acquired through the at least one camera is displayed based at least on each of the determined direction and the determined orientation.

9. The electronic device of claim 1, further comprising:

at least one sensor to be used for detecting an orientation of the electronic device, the at least one sensor being disposed inside at least one of the first housing or the second housing, wherein the at least one processor is further configured, when the instructions are executed, to:

determine the orientation of the electronic device and the direction in which the at least one camera is pointed using the at least one sensor.

10. The electronic device of claim 9, wherein the determined orientation corresponds to an orientation for acquiring an image for a landscape.

11. A method of operating an electronic device including a flexible display extending across a first housing and a second housing, the method comprising:

determining an orientation of the electronic device based on a first angle between the first housing and a ground;

determining a direction of at least one camera relative to the ground in which the at least one camera, which is exposed through at least a portion of the first housing of the electronic device, is pointed during execution of a camera application, based on the determined orientation and a second angle between the first housing and the second housing;

identifying at least one of a first area corresponding to the first housing or a second area corresponding to the second housing as an area in which a preview image acquired through the at least one camera is to be displayed based at least on the determined direction and the determined orientation; and displaying the preview image, acquired through the at least one camera, in the identified area.

12. The method of claim 11, wherein the displaying of the preview image includes:

displaying a preview image, acquired through the at least one camera, in the first area using the flexible display based on identifying that the direction of the at least one camera relative to the ground corresponds to a first direction; and displaying the preview image, acquired through the at least one camera, in the second area using the flexible display based on identifying that the direction of the at least one camera relative to the ground corresponds to a second direction, which is distinct from the first direction.

13. The method of claim 12, further comprising:
displaying a capture icon for acquiring an image for the preview image in the second area using the flexible display while the preview image is being displayed in the first area; and
acquiring the image in response to reception of input for the capture icon.

14. The method of claim 13, further comprising:
displaying a thumbnail image for representing the image in the second area using the flexible display in response to the acquiring of the image.

15. The method of claim 13, further comprising:
displaying at least one of: at least one first icon for selecting a type of the image, at least one second icon for selecting an effect to be applied to the image, or at least one third icon for adjusting a magnification of the image, together with the capture icon using the flexible display.

16. The method of claim 15,
wherein the at least one second icon includes a filter option icon for selecting an image filter to be applied to the image, and
wherein the method further comprises:
receiving an input for the filter option icon while the preview image is being displayed in the first area;
displaying other multiple preview images, which are distinct from the preview image displayed in the first area, in the second area using the flexible display in response to reception of the input for the filter option icon, each of the other multiple preview images being acquired based on applying a corresponding filter effect to the image; and
displaying the preview image, which is being displayed in the second area, in a highlighted form using the flexible display and changing the preview image, which is being displayed in the first area, to the selected preview image in response to reception of input for selecting one preview image among the other multiple preview images.

17. The method of claim 12, wherein the first direction is substantially perpendicular to the second direction.

18. The method of claim 11, wherein the displaying of the preview image includes:
identifying the second angle between the first housing and the second housing, which is detected using at least one sensor; and
identifying at least one of the first area or the second area as an area in which a preview image acquired through the at least one camera is displayed based at least on each of the determined direction and the determined orientation.

19. The method of claim 18, wherein the determined orientation corresponds to an orientation for acquiring an image for a landscape.

20. An electronic device comprising:
a first housing including a first face and a second face, the second face facing away from the first face;
a second housing including a third face and a fourth face, the fourth face facing away from the third face;
a folding part rotatably connecting a side face of the first housing and a side face of the second housing, which faces the side face of the first housing;
a flexible display disposed on the first face and the third face across the folding part and including a first area corresponding to the first face and a second area corresponding to the third face;
at least one camera exposed through at least a portion of the fourth face;
at least one memory configured to store instructions; and
at least one processor,
wherein the at least one processor is configured, when the instructions are executed, to:
identify whether a direction in which the at least one camera is pointed is changed while a preview image acquired through the at least one camera is being displayed in the second area using the flexible display, and
move the preview image from the second area to the first area using the flexible display in response to an identification result,
wherein the direction is identified based on a first angle and a second angle, and
wherein the first angle is an angle between the first housing and a ground, and the second angle is an angle between the first housing and the second housing.

* * * * *